United States Patent
Liu

(10) Patent No.: US 12,026,492 B2
(45) Date of Patent: Jul. 2, 2024

(54) METHOD AND SYSTEM FOR OBTAINING DOWNLOAD INFORMATION OF APPLICATION FOR MANAGING IoT DEVICES

(71) Applicant: Huawei Technologies Co., Ltd., Shenzhen (CN)

(72) Inventor: Banghong Liu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/182,099

(22) Filed: Mar. 10, 2023

(65) Prior Publication Data

US 2023/0214201 A1 Jul. 6, 2023

Related U.S. Application Data

(63) Continuation of application No. PCT/CN2021/115309, filed on Aug. 30, 2021.

(30) Foreign Application Priority Data

Sep. 10, 2020 (CN) .......................... 202010948753.0

(51) Int. Cl.
| | |
|---|---|
| H04L 67/125 | (2022.01) |
| G06F 8/61 | (2018.01) |
| H04L 67/146 | (2022.01) |
| H04W 4/70 | (2018.01) |
| H04W 76/11 | (2018.01) |

(52) U.S. Cl.
CPC .............. *G06F 8/61* (2013.01); *H04L 67/125* (2013.01); *H04L 67/146* (2013.01); *H04W 4/70* (2018.02); *H04W 76/11* (2018.02)

(58) Field of Classification Search
CPC ....... G06F 8/61; H04L 67/146; H04L 67/125; H04L 67/34; H04L 67/06; H04L 67/12; H04W 76/11; H04W 4/60; H04W 4/70; H04W 4/80; H04M 1/72406; H04M 1/72412

See application file for complete search history.

(56) References Cited

U.S. PATENT DOCUMENTS

| | | | | |
|---|---|---|---|---|
| 2011/0244796 A1* | 10/2011 | Khan | .................... | H04W 4/80 455/41.1 |
| 2015/0032569 A1 | 1/2015 | Strömberg | | |
| 2015/0116089 A1* | 4/2015 | Enomoto | ........... | G06K 7/10297 340/10.1 |

(Continued)

FOREIGN PATENT DOCUMENTS

| | | |
|---|---|---|
| CN | 103246997 A | 8/2013 |
| CN | 103347258 A | 10/2013 |

(Continued)

*Primary Examiner* — Aftab N. Khan
(74) *Attorney, Agent, or Firm* — Conley Rose, P.C.

(57) ABSTRACT

A method for obtaining download information of an application includes: a first device reading tag data of a second device; a second server receiving a first request that carries identification information of the second device and application supporting capability information of the first device. The identification information is associated with the tag data and the first request is used for obtaining download information of a device management application from the second server.

20 Claims, 13 Drawing Sheets

(56) References Cited

U.S. PATENT DOCUMENTS

| | | | | |
|---|---|---|---|---|
| 2015/0229703 | A1* | 8/2015 | Merkel | H04L 67/10 |
| | | | | 709/203 |
| 2015/0321089 | A1* | 11/2015 | Akavia | A63F 13/235 |
| | | | | 463/39 |
| 2017/0094021 | A1 | 3/2017 | Brech et al. | |
| 2017/0169471 | A1* | 6/2017 | Arneson | G06Q 10/087 |
| 2017/0302823 | A1* | 10/2017 | Saito | H04N 1/4433 |
| 2019/0220264 | A1* | 7/2019 | Yoon | G06F 8/61 |
| 2021/0377344 | A1* | 12/2021 | Chen | H04L 67/30 |
| 2023/0068641 | A1* | 3/2023 | Lu | H04L 12/2809 |
| 2023/0221947 | A1* | 7/2023 | Jonnala | G06F 8/61 |
| | | | | 717/171 |

FOREIGN PATENT DOCUMENTS

| | | | |
|---|---|---|---|
| CN | 104699509 | A | 6/2015 |
| CN | 106331993 | A | 1/2017 |
| CN | 106452516 | A | 2/2017 |
| CN | 107465646 | A | 12/2017 |
| CN | 107786663 | A | 3/2018 |
| CN | 107797526 | A | 3/2018 |
| CN | 109413515 | A | 3/2019 |
| CN | 109871217 | A | 6/2019 |
| CN | 109918590 | A | 6/2019 |
| CN | 110147666 | A | 8/2019 |
| CN | 110752976 | A | 2/2020 |
| CN | 111246545 | A | 6/2020 |
| CN | 111401086 | A | 7/2020 |

\* cited by examiner

| CONT. FROM FIG. 10A | CONT. FROM FIG. 10A | CONT. FROM FIG. 10A | CONT. FROM FIG. 10A |

Determine, from the one or more applications corresponding to the water purifier based on the application supporting capability information of the mobile phone, a water purifier application supported by the mobile phone — S360

S370: Send download information of the water purifier application (including an installation package name of the water purifier application)

S371: Send an app ID obtaining request for the water purifier application based on the installation package name of the water purifier application S372: Send an app ID of the water purifier application Locally store the download information of the water purifier application — S380

S390: Send the download information of the water purifier application

Download and start the water purifier application based on the download information of the water purifier application — S395

FIG. 10B

METHOD AND SYSTEM FOR OBTAINING DOWNLOAD INFORMATION OF APPLICATION FOR MANAGING IoT DEVICES

CROSS-REFERENCE TO RELATED APPLICATIONS

This is a continuation of International Patent Application No. PCT/CN2021/115309 filed on Aug. 30, 2021, which claims priority to Chinese Patent Application No. 202010948753.0 filed on Sep. 10, 2020. The disclosures of the aforementioned applications are hereby incorporated by reference in their entireties.

TECHNICAL FIELD

This application relates to the field of software technologies, and particularly to a method and a system for obtaining download information of an application, a method for providing download information of an application, a server, and a computer-readable storage medium.

BACKGROUND

Currently, the Internet of things (IoT) technology is developing rapidly. In both production and life fields, the Internet of things has profound impact on conventional modes.

Smart home is an important application scenario of the Internet of things technology. In a smart home life scenario, each smart home device is connected to a control terminal by using a network (for example, Bluetooth, Wi-Fi, or another wireless network), so that a user can control and manage the smart home device by using the control terminal, to construct an intelligent life scenario.

In the smart home life scenario, when the user reads a device tag (for example, a near-field communication (NFC) tag) on a smart home device by using a mobile phone, a device management application corresponding to the smart home device may be started. In this way, people can control smart home devices (for example, start the smart home devices) by using device management applications on mobile phones, thereby bringing convenience to life.

In a conventional technology, a mobile phone downloads and installs a device management application by using application download information (for example, a uniform resource locator (URL) download address of the device management application or an installation package name of the device management application) written in a device tag. That is, the download information of the device management application is written in the device tag. Therefore, a problem that the application download information cannot be flexibly maintained exists.

SUMMARY

Some implementations of this application provide a method and a system for obtaining download information of an application, a method for providing download information of an application, a server, and a computer-readable storage medium. The following describes this application from a plurality of aspects. Mutual reference may be made to implementations and beneficial effects of the following plurality of aspects.

According to a first aspect, an implementation of this application provides a method for obtaining download information of an application. The method is applied to a system including at least a first device, a second device, and a second server. The second server is associated with the second device. The method includes: The first device reads tag data of the second device. The second server receives a first request. The first request carries identification information of the second device and application supporting capability information of the first device. The identification information is associated with the tag data. The first request is used for obtaining download information of a device management application from the second server. The device management application is used for managing the second device. The second server determines, in response to the first request, the device management application based on the identification information and the application supporting capability information of the first device. The second server sends a first request response. The first request response carries the download information of the device management application. The first device obtains at least the download information of the device management application sent by the second server.

According to this implementation of this application, the download information of the device management application is obtained from the second server instead of being fixedly written in a device tag. In this application, the second server maintains the download information of the device management application instead of maintaining download information of the device management application by using a device tag. In this way, regardless of how the download information of the device management application is updated, the second server can return real-time and effective application download information to the first device, thereby resolving a problem of inflexible maintenance of application download information.

In some implementations, the first device includes a first software development kit (SDK). Before the second server receives the first request, the method further includes: The first device parses the tag data through the first SDK. The first device obtains, through parsing, the identification information included in the tag data. The identification information includes a category identifier, a model identifier, and/or a first serial number of the second device. The first device sends the first request to the second server.

In some implementations, the download information of the device management application sent by the second server includes one or more of the following: an application ID of the device management application, an installation package name of the device management application, and a URL download address of the device management application.

In the implementations of this application, the application ID of the device management application is a unique identifier of the device management application in an application market, for example, an app ID.

In some implementations, that the second server sends a first request response is specifically: The second server sends the first request response to the first device. That the first device obtains at least the download information of the device management application sent by the second server includes: The first device receives the download information of the device management application sent by the second server.

In some implementations, the system includes a third server. The download information of the device management application sent by the second server includes the installation package name of the device management application. After the first device receives the download information of the device management application sent by the second server, the method further includes: The first device sends a third request to the third server. The third request carries the installation package name of the device management application. The third request is used for obtaining the application ID of the device management application. The third server determines, in response to the third request, the application ID of the device management application based on the installation package name of an installation package of the device management application. The third server sends a third request response to the first device. The third request response carries the application ID of the device management application. The first device receives the application ID of the device management application sent by the third server.

In some implementations, the first device stores an association relationship between the tag data and the download information of the device management application.

In this way, when reading the tag data of the second device next time, the first device may start the device management application based on the download information of the device management application stored in the first device, so as to improve an application startup speed of the first device.

In some implementations, after the first device stores the association relationship between the tag data and the download information of the device management application, the method further includes: The first device reads the tag data of the second device. The first device determines, based on the association relationship, the download information associated with the read tag data. The first device downloads and starts the device management application based on the download information associated with the read tag data.

In some implementations, the application supporting capability information of the first device includes information for identifying a product model of the first device and/or information about an operating system of the first device. The information for identifying the product model of the first device includes at least one of a product brand, the product model, a product category, and a product serial number of the first device. The information about the operating system of the first device includes at least one of a name of the operating system of the first device and a version number of the operating system of the first device.

According to a second aspect, an implementation of this application provides a method for obtaining download information of an application. The method is applied to a system including at least a first device, a second device, and a second server. The second server is associated with the second device. The method includes: The first device reads tag data of the second device. The second server receives a first request. The first request carries identification information of the second device and application supporting capability information of the first device. The identification information is associated with the tag data. The first request is used for obtaining download information of a device management application from the second server. The device management application is used for managing the second device. The second server determines, in response to the first request, the device management application based on the identification information and the application supporting capability information of the first device. The second server sends a first request response. The first request response carries the download information of the device management application. The first device obtains at least the download information of the device management application sent by the second server.

According to this implementation of this application, the download information of the device management application is obtained from the second server instead of being fixedly written in a device tag. In this application, the second server maintains the download information of the device management application instead of maintaining download information of the device management application by using a device tag. In this way, regardless of how the download information of the device management application is updated, the second server can return real-time and effective application download information to the first device, thereby resolving a problem of inflexible maintenance of application download information.

In some implementations, the system further includes a first server. The first server is associated with the first device. Before the second server receives the first request, the method further includes: The first device sends a second request to the first server. The second request carries the tag data and the application supporting capability information of the first device. The first server parses the tag data. The first server obtains, through parsing, the identification information included in the tag data. The identification information includes a category identifier, a model identifier, and/or a first serial number of the second device. The first server sends the first request to the second server.

According to the implementations of this application, the first server parses the tag data of the second device, and sends the first request to the second server. In this way, the first device does not need to parse the tag data of the second device or directly communicate with the second server, but only needs to communicate with the first server. In this way, the first device does not need to integrate the first SDK, which can save local storage space of the first device.

In some implementations, the download information of the device management application sent by the second server includes one or more of the following: an application ID of the device management application, an installation package name of the device management application, and a URL download address of the device management application.

In some implementations, before the first device obtains at least the download information of the device management application sent by the second server, the method further includes: The first server receives the download information of the device management application sent by the second service. The first server sends a second request response to the first device. The second request response includes the download information of the device management application sent by the second server. That the first device obtains at least the download information of the device management application sent by the second server includes: The first device obtains, in response to receiving the second request response, the download information of the device management application sent by the second server.

In some implementations, the system includes a third server. The download information of the device management application received by the first server from the second server includes the installation package name of the device management application. Before the first server sends the second request response to the first device, the method further includes: The first server sends a fourth request to the third server. The fourth request carries the installation package name of the device management application. The fourth request is used for obtaining the application ID of the device management application. The third server determines, in response to the fourth request, the application ID of the device management application based on the installation package name of an installation package of the device management application. The third server sends a fourth request response to the first server. The fourth request response carries the application ID of the device management application. The first server receives the application ID of the device management application sent by the third server. That the first server sends a second request response to the first device is specifically: The first server sends the second request response to the first device, where the second request response includes the application ID of the device management application and the download information of the device management application sent by the second server. That the first device obtains at least the download information of the device management application sent by the second server includes: The first device obtains, in response to receiving the second request response, the application ID of the device management application and the download information of the device management application sent by the second server.

In some implementations, the first server stores an association relationship between the tag data, the application supporting capability information of the first device, and the download information of the device management application.

In this way, when the first server receives the second request of the first device, but the first server fails to obtain the download information of the device management application from the second server (for example, when a communication fault occurs), the first server may send the locally stored download information of the device management application to the first device.

In some implementations, the application supporting capability information of the first device includes information for identifying a product model of the first device and/or information about an operating system of the first device. The information for identifying the product model of the first device includes at least one of a product brand, the product model, a product category, and a product serial number of the first device. The information about the operating system of the first device includes at least one of a name of the operating system of the first device and a version number of the operating system of the first device.

According to a third aspect, an implementation of this application provides a method for providing download information of an application, applied to a second server associated with a second device. The method includes: receiving a first request, where the first request carries identification information of the second device and application supporting capability information of a first device, the identification information is associated with tag data of the second device, the first request is used for obtaining download information of a device management application from the second server, and the device management application is used for managing the second device; determining, in response to the first request, the device management application based on the identification information and the application supporting capability information of the first device; and sending a first request response, where the first request response carries the download information of the device management application.

According to this implementation of this application, the download information of the device management application is obtained from the second server instead of being fixedly written in a device tag. In this application, the second server maintains the download information of the device management application instead of maintaining download information of the device management application by using a device tag. In this way, regardless of how the download information of the device management application is updated, the second server can return real-time and effective application download information to the first device, thereby resolving a problem of inflexible maintenance of application download information.

In addition, according to this implementation of this application, the first server parses the tag data of the second device, and sends the first request to the second server. In this way, the first device only needs to communicate with the first server without parsing the tag data of the second device or directly communicating with the second server. In this way, the first device does not need to integrate the first SDK, which can save local storage space of the first device.

In some implementations, the identification information of the second device includes a category identifier, a model identifier, and/or a first serial number of the second device.

In some implementations, the identification information of the second device includes a category identifier of the second device. The determining the device management application based on the identification information and the application supporting capability information of the first device includes: determining, based on the category identifier of the second device, one or more applications for managing the second device; and determining, from the one or more applications based on the application supporting capability information of the first device, the device management application capable of running on the first device.

In some implementations, the identification information of the second device includes the first serial number of the second device. The first serial number is a serial number that is different from a product serial number of the second device and that is associated with the product serial number of the second device. The determining the device management application based on the identification information and the application supporting capability information of the first device includes: determining, based on the first serial number, the product serial number associated with the first serial number, and determining, based on the product serial number associated with the first serial number, one or more applications for managing the second device; and determining, from the one or more applications based on the application supporting capability information of the first device, the device management application capable of running on the first device.

In some implementations, the download information of the device management application sent by the second server includes one or more of the following: an application ID of the device management application, an installation package name of the device management application, and a URL download address of the device management application.

In some implementations, the application supporting capability information of the first device includes information for identifying a product model of the first device and/or information about an operating system of the first device. The information for identifying the product model of the first device includes at least one of a product brand, the product model, a product category, and a product serial number of the first device. The information about the operating system of the first device includes at least one of a name of the operating system of the first device and a version number of the operating system of the first device.

According to a fourth aspect, an implementation of this application provides a method for obtaining download information of an application, applied to a first server associated with a first device. The method includes: receiving a second request sent by the first device, where the second request carries tag data of a second device and application supporting capability information of the first device; obtaining identification information of the second device from the tag data through parsing, where the identification information includes a category identifier, a model identifier, and/or a first serial number of the second device; sending a first request to a second server, where the first request carries the identification information of the second device and the application supporting capability information of the first device, and the first request is used for obtaining, from the second server, download information of a device management application for managing the second device; receiving a first request response sent by the second server, where the first request response carries the download information of the device management application; and sending a second request response to the first device, where the second request response carries the download information of the device management application sent by the second server.

According to this implementation of this application, the download information of the device management application is obtained from the second server instead of being fixedly written in a device tag. In this application, the second server maintains the download information of the device management application instead of maintaining download information of the device management application by using a device tag. In this way, regardless of how the download information of the device management application is updated, the second server can return real-time and effective application download information to the first device, thereby resolving a problem of inflexible maintenance of application download information.

In some implementations, the download information of the device management application sent by the second server includes one or more of the following: an application ID of the device management application, an installation package name of the device management application, and a URL download address of the device management application.

In some implementations, the download information of the device management application sent by the second server includes an installation package name of the device management application. Before the sending a second request response to the first device, the method further includes: sending a fourth request to a third server, where the fourth request carries the installation package name of the device management application, and the fourth request is used for obtaining an application ID of the device management application; receiving a fourth request response sent by the third server, where the fourth request response carries the application ID of the device management application; and sending the second request response to the first device, where the second request response includes the download information of the device management application sent by the second server and the application ID of the device management application.

In some implementations, the method further includes: storing an association relationship between the tag data, the application supporting capability information of the first device, and the download information of the device management application.

In this way, when the first server receives the second request of the first device, but the first server fails to obtain the download information of the device management application from the second server (for example, when a communication fault occurs), the first server may send the locally stored download information of the device management application to the first device.

According to a fifth aspect, an implementation of this application provides a system for obtaining download information of an application. The system includes a first device, a second device, and a second server. The second server is associated with the second device. The first device is configured to perform the steps performed by the first device in the method provided in any implementation of the first aspect of this application. The second server is configured to perform the steps performed by the second server in the method provided in any implementation of the first aspect of this application. For beneficial effects that can be achieved in the fifth aspect, refer to beneficial effects of any implementation of the first aspect of this application. Details are not described herein again.

According to a sixth aspect, an implementation of this application provides a system for obtaining download information of an application. The system includes a first device, a first server, a second device, and a second server. The first device is associated with the second device. The second server is associated with the second device. The first device is configured to perform the steps performed by the first device in the method provided in any implementation of the second aspect of this application. The first server is configured to perform the steps performed by the first server in the method provided in any implementation of the second aspect of this application. The second server is configured to perform the steps performed by the second server in the method provided in any implementation of the second aspect of this application. For beneficial effects that can be achieved in the sixth aspect, refer to beneficial effects of any implementation of the second aspect of this application. Details are not described herein again.

According to a seventh aspect, an implementation of this application provides a server, including: a memory, configured to store instructions executed by one or more processors of the server; and a processor, where when the processor executes the instructions in the memory, the server is enabled to perform the method provided in any implementation of the third aspect of this application. For beneficial effects that can be achieved in the seventh aspect, refer to beneficial effects of any implementation of the third aspect of this application. Details are not described herein again.

According to an eighth aspect, an implementation of this application provides a server, including: a memory, configured to store instructions executed by one or more processors of the server; and a processor, where when the processor executes the instructions in the memory, the server is enabled to perform the method provided in any implementation of the fourth aspect of this application. For beneficial effects that can be achieved in the eighth aspect, refer to beneficial effects of any implementation of the fourth aspect of this application. Details are not described herein again.

According to a ninth aspect, an implementation of this application provides a computer-readable storage medium. The computer-readable storage medium stores instructions. When the instructions are executed on a computer, the computer is enabled to perform the method provided in any implementation of the first aspect of this application, any implementation of the second aspect of this application, any implementation of the third aspect of this application, or any implementation of the fourth aspect of this application. For beneficial effects that can be achieved in the ninth aspect, refer to beneficial effects of any implementation of the first aspect of this application, any implementation of the second aspect of this application, any implementation of the third aspect of this application, or any implementation of the fourth aspect of this application. Details are not described herein again.

BRIEF DESCRIPTION OF DRAWINGS

FIG. 10A and FIG. 10B are a schematic flowchart 3 of a method for obtaining download information of a device management application according to an embodiment of this application;

DESCRIPTION OF EMBODIMENTS

The following describes specific implementations of this application in detail with reference to the accompanying drawings.

In this application, a smart home device may be a home device with a specific computing capability and a communication function, such as a smart audio and video device, a smart speaker, a smart electric lamp, a smart refrigerator, or a smart television. The following uses a smart water purifier as an example for description.

Figure 1:
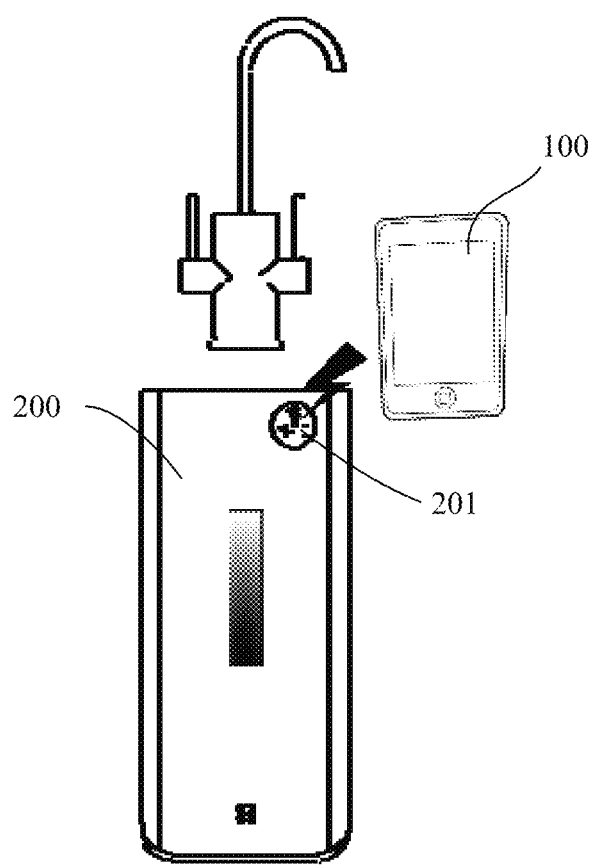
FIG. 1 is an example application scenario according to an implementation of this application.

FIG. 1 shows a smart home life scenario. FIG. 1 includes a mobile phone 100 and a water purifier 200. The mobile phone 100 is used as an example of a control terminal. The water purifier 200 is used as an example of a smart home device. The mobile phone 100 and the water purifier 200 are connected to a home Wi-Fi local area network by using respective Wi-Fi communications modules, so as to implement mutual communication of the mobile phone 100 and the water purifier 200. In another scenario, the mobile phone 100 and the water purifier 200 may communicate with each other in a manner such as Bluetooth, NFC, or a cellular network. This is not limited in this application.

A device management application for managing the water purifier 200 is installed in the mobile phone 100 (in this specification, the device management application for managing the water purifier 200 is referred to as a "water purifier application" for short). Then, a user can operate the water purifier application to access and operate the water purifier 200, for example, view a service life of a filter element and a purified water volume statistical curve of the water purifier 200, and turn on/turn off the water purifier 200.

Refer to FIG. 1. An NFC tag 201 is attached to the water purifier 200. When needing to open the water purifier application, the user may place the mobile phone 100 close to the NFC tag 201, and then the mobile phone 100 may read tag data in the NFC tag 201, so as to start the water purifier application in the mobile phone 100. The water purifier application is started by reading the NFC tag. On one hand, a process of searching for a smart water purifier icon from many application icons can be omitted for the user, thereby simplifying operations. On the other hand, when the water purifier application is a quick application or an applet, the mobile phone 100 may not display the icon of the water purifier application on a home screen of the mobile phone 100, and a way for the user to start the water purifier application may be provided in a manner of starting the application by reading the NFC tag.

In the scenario shown in FIG. 1, a carrier of the tag data is the NFC tag. In another scenario, the carrier of the tag data may be a carrier with a data bearing function, such as a two-dimensional code tag, a bar code tag, or a radio frequency identification (RFID) tag. This is not limited in this application.

In an implementation, a URL download address of the water purifier application is written in the NFC tag. The mobile phone 100 may obtain the URL download address by reading the NFC tag, and further download and install the water purifier application by using the URL download address. Generally, the water purifier application obtained in this manner is a conventional app, and an installation process of the water purifier application requires participation of the user. To be specific, after an installation package of the water purifier application is downloaded, the user needs to tap "Install", so that the mobile phone 100 performs installation of the application. Operations are relatively complex.

In addition, in this implementation, the URL download address in the NFC tag is fixed, which causes a problem that application download information cannot be flexibly maintained. For example, when the URL download address of the water purifier application changes (for example, when an address of a server that provides downloading of the water purifier application changes), it is difficult to obtain the water purifier application by using the URL download address in the NFC tag.

In another implementation, an installation package name of the water purifier application is written in the NFC tag. The mobile phone 100 may obtain the installation package name of the water purifier application by reading the NFC tag, and further download, from an application market, and install the water purifier application by using the installation package name. Generally, the water purifier application obtained in this manner is a quick application or an applet. Therefore, in this implementation, the mobile phone 100 may install the water purifier application in a user-unaware manner. However, this implementation also has the problem that the application download information cannot be flexibly maintained. For example, when the installation package name of the water purifier application changes (for example, when a name of a vendor that provides the water purifier application changes, a "vendor identifier" field in the installation package name of the water purifier application changes accordingly), in this case, it is difficult to obtain the water purifier application by using the installation package name in the NFC tag.

In addition, it may be understood that mobile phones using different operating systems or mobile phones of different brands may support different water purifier applications (for example, an Apple iOS mobile phone and an Android mobile phone support different water purifier applications, and it is also possible that Android mobile phones of different brands support different water purifier applications). To support distribution of application information of mobile phones of multiple brands, the tag data needs to include the application information corresponding to each brand. However, due to a limited amount of data stored in the NFC tag, it is difficult to support the distribution of the application information of the mobile phones of the multiple brands.

Therefore, an implementation of this application provides a method for obtaining download information of a device management application, to resolve the foregoing technical problem. For ease of understanding, the scenario shown in FIG. 1 is still used as an example for description. In this application, the mobile phone 100 does not obtain download information of the water purifier application from the NFC tag of the water purifier 200, but obtains the download information of the water purifier application from a vendor server (referred to as an "IoT device vendor server" in this specification) of the water purifier 200. Specifically, identification information (for example, a category identifier, a model identifier, and a virtual serial number (used as a first serial number, and a meaning of the virtual serial number is explained below) of the water purifier 200) of the water purifier 200 is written in the NFC tag 201 of the water purifier 200 (used as a second device). After reading the NFC tag of the water purifier 200, the mobile phone 100 (used as a first device) parses the NFC tag data locally on the mobile phone 100 or by using a mobile phone vendor server (used as a first server), to obtain the identification information of the water purifier 200 written in the NFC tag. Then, the mobile phone or the mobile phone vendor server sends the identification information of the water purifier 200 and application supporting capability information (for example, vendor information, brand information, an operating system name, and version information of the mobile phone 100) of the mobile phone 100 to the IoT device vendor server (used as a second server) corresponding to a device vendor of the water purifier. After receiving the information sent by the mobile phone 100, the IoT device vendor server determines, based on the identification information of the water purifier 200 and the application supporting capability information of the mobile phone 100, the water purifier application capable of running on the mobile phone 100, and returns the download information (for example, the URL download address, the installation package name, and an app ID) of the water purifier application to the mobile phone 100. After obtaining the download information of the water purifier application, the mobile phone 100 may download and start the water purifier application.

In this implementation of this application, the download information of the water purifier application is determined by the IoT device vendor server based on the identification information of the water purifier 200 and the application supporting capability information of the mobile phone 100, instead of being fixedly written in the NFC tag. In other words, in this application, the download information of the water purifier application is maintained by using the IoT device vendor server instead of the NFC tag. In this way, regardless of how the download information of the water purifier application is updated, the IoT device vendor server can return real-time and effective application download information to the mobile phone 100, thereby resolving the problem of inflexible maintenance of application download information in a conventional technology.

It is to be noted that in the foregoing descriptions, the IoT device vendor server provides the download information of the water purifier application for the mobile phone 100. In other words, in the foregoing descriptions, the IoT device vendor server is used as a server for maintaining the download information of the water purifier application. However, this application is not limited thereto. In another embodiment, another device (for example, the mobile phone vendor server or a HUAWEI ability gallery (HAG)) may be used as a server for maintaining the download information of the water purifier application. In this case, the download information of the water purifier application is provided for the mobile phone 100 by using the another device (for example, the mobile phone vendor server or the HAG).

The foregoing describes technical solutions of this application by using the scenario shown in FIG. 1 as an example. This application is not limited thereto. The technical solutions of this application may be applied to a smart home device (for example, a smart air conditioner or a smart washing machine) other than the water purifier 200, and another IoT device other than the smart home device, for example, an urban public facility (for example, a road surveillance camera or a fire extinguishing device), a factory line device (for example, various position sensors and drive motors), and a construction device (for example, a winch or an electric welding machine), and office equipment (for example, a projector, a printer, and a mouse), which are not described one by one.

In this application, the server (for example, the IoT device vendor server) may be a distributed server. For the distributed server, data and programs are not located on a same server, but are distributed to a plurality of servers, and the plurality of servers collaboratively complete a target task (for example, storing a "tag-application" mapping table mentioned below, and determining the water purifier application for the mobile phone).

In this application, the control terminal that controls an IoT device is not limited to the mobile phone, and may alternatively be another device with a computing and display capability, for example, a smart screen, a tablet, or a notebook computer. This is not limited in this application. The following uses the mobile phone 100 as an example for description.

In this application, application supporting capability information of the control terminal includes information for identifying a product model of the control terminal and/or information about an operating system of the control terminal. The information for identifying the product model of the control terminal includes any information capable of identifying the product, including, but not limited to, a product brand, the product model, a product serial number, a product category, and the like. The product brand of the control terminal is, for example, Huawei or Apple. The product model of the control terminal includes a product code, digits, and letters, for example, iPhone 11 and Mate 40, or may be a product model including only letters and digits, for example, A2234. The product serial number of the control terminal is a unique identification code of the control terminal. The product model may be obtained through query based on the identification code. The product category of the control terminal refers to a category that the product belongs to, for example, a mobile phone, a tablet, or a watch.

Figure 2:
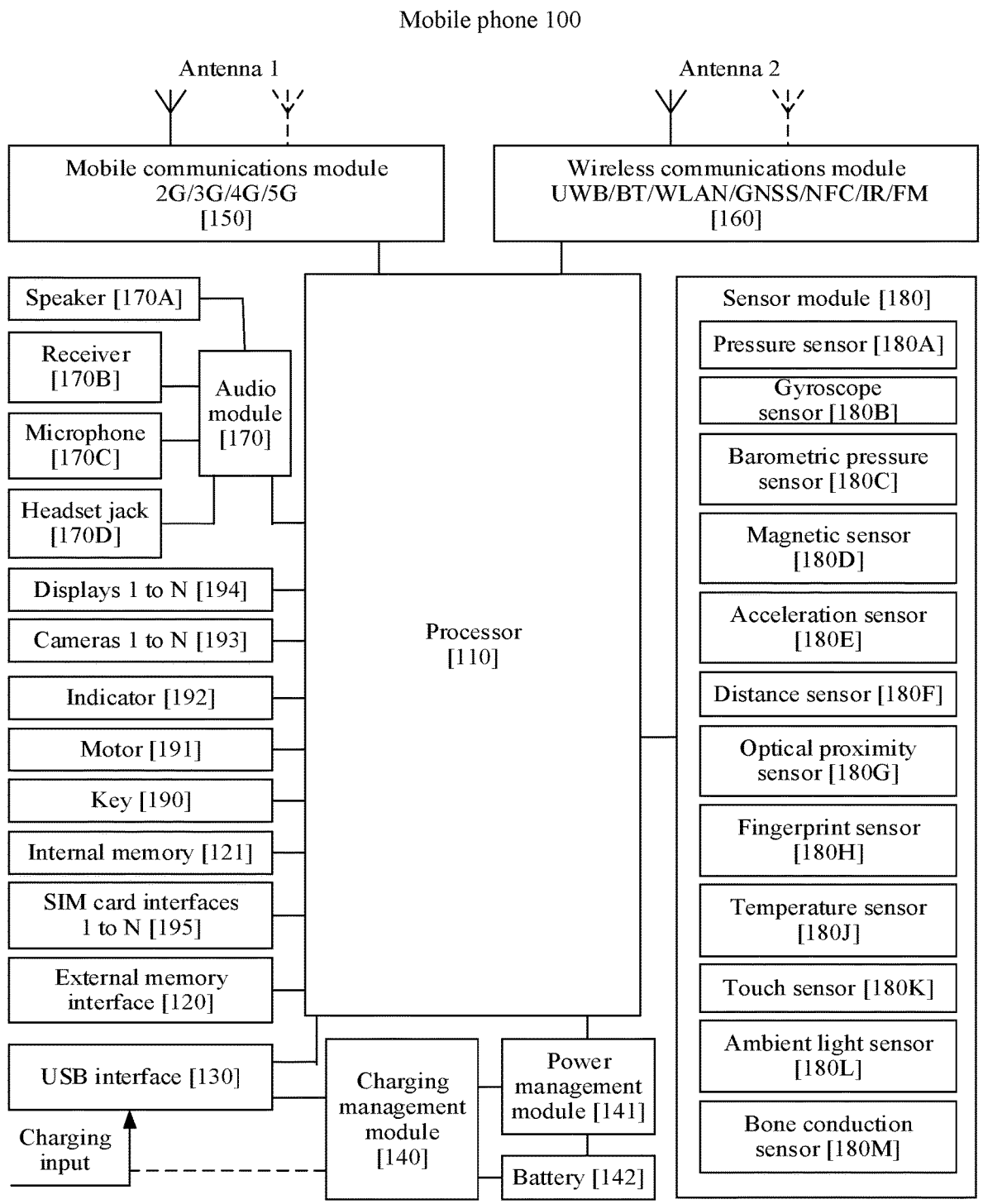
FIG. 2 is a schematic diagram depicting a structure of a mobile phone according to an embodiment of this application.

FIG. 2 is a schematic diagram depicting a structure of the mobile phone 100.

The mobile phone 100 may include a processor 110, an external memory interface 120, an internal memory 121, a universal serial bus (USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity (or identification) module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that an illustrated structure in the embodiments of the present disclosure does not constitute a specific limitation on the mobile phone 100. In some other embodiments of this application, the mobile phone 100 may include more or fewer components than those shown in the figure, or some components may be combined, or some components may be split, or there may be a different component layout. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent devices, or may be integrated into one or more processors.

The processor may generate an operation control signal based on an instruction operation code and a time sequence signal to control instruction fetching and instruction executing.

A memory may be further disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse-code modulation (PCM) interface, a universal asynchronous receiver/transmitter (UART) interface, a mobile industry processor interface (MIPI), a general-purpose input/output (GPIO) interface, or a SIM interface.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the mobile phone 100.

The I2S interface may be configured for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured for audio communication, and analog signal sampling, quantization, and coding. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call through a Bluetooth headset. Both the I2S interface and the PCM interface may be configured for audio communication.

The UART interface is a universal serial data bus, and is configured for asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a photographing function of the mobile phone 100. The processor 110 communicates with the display 194 through the DSI interface, to implement a display function of the mobile phone 100.

The GPIO interface may be configured by using software. The GPIO interface may be configured as a control signal, or may be configured as a data signal. In some embodiments, the GPIO interface may be configured to connect the processor 110 to the camera 193, the display 194, the wireless communications module 160, the audio module 170, the sensor module 180, or the like. The GPIO interface may be further configured as the I2C interface, the I2S interface, the UART interface, the MIPI interface, or the like.

It may be understood that an interface connection relationship between the modules shown in this embodiment of the present disclosure is merely an example for description, and does not constitute a limitation on the structure of the mobile phone 100. In some other embodiments of this application, the mobile phone 100 may alternatively use an interface connection manner different from that in the foregoing embodiment, or use a combination of a plurality of interface connection manners.

A wireless communication function of the mobile phone 100 may be implemented through the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the mobile phone 100 may be configured to cover one or more communications frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communications module 150 may provide a solution, applied to the mobile phone 100, to wireless communication including 2G, 3G, 4G, 5G, and the like. The mobile communications module 150 may include at least one filter, a switch, a power amplifier, a low-noise amplifier (LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules of the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal by using an audio device (which is not limited to the speaker 170A, the receiver 170B, and the like), or displays an image or a video on the display 194. In some embodiments, the modem processor may be an independent component. In some other embodiments, the modem processor may be independent of the processor 110, and is disposed in the same device as the mobile communications module 150 or another functional module.

The wireless communications module 160 may provide a solution to wireless communication applied to the mobile phone 100, for example, a wireless local area network (wireless local area network, WLAN) (for example, a Wi-Fi network), Bluetooth (BT), a global navigation satellite system (GNSS), frequency modulation (FM), near field communication (NFC), and an infrared (IR) technology. The wireless communications module 160 may be one or more components integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the mobile phone 100, the antenna 1 and the mobile communications module 150 are coupled, and the antenna 2 and the wireless communications module 160 are coupled, so that the mobile phone 100 may communicate with a network and another device by using a wireless communications technology. The wireless communications technology may include a Global System for Mobile Communications (GSM), a general packet radio service (GPRS), code-division multiple access (CDMA), wideband CDMA (WCDMA), time-division CDMA (TD-SCDMA), Long-Term Evolution (LTE), BT, a GNSS, a WLAN, NFC, FM, an IR technology, and/or the like. The GNSS may include a Global Positioning System (GPS), a global navigation satellite system (GLONASS), a BeiDou navigation satellite system (BDS), a quasi-zenith satellite system (QZSS), and/or a satellite based augmentation system (SBAS).

The mobile phone 100 implements the display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, or the like. The display 194 includes a display panel. The display panel may be a liquid-crystal display (LCD), an organic light-emitting diode (OLED), an active-matrix OLED (AMOLED), a flexible light-emitting diode (FLED), a mini-LED, a micro-LED, a micro-OLED, a quantum dot light emitting diode (QLED), or the like. In some embodiments, the mobile phone 100 may include one or N displays 194, where N is a positive integer greater than 1.

The external memory interface 120 may be configured to connect an external storage card, for example, a Micro SD card, to extend a storage capability of the mobile phone 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may store data (such as audio data and an address book) and the like created during use of the mobile phone 100. In addition, the internal memory 121 may include a high-speed random access memory, and may further include a nonvolatile memory, for example, at least one magnetic disk storage device, a flash memory device, or a universal flash storage (UFS). The processor 110 performs various function applications of the mobile phone 100 and data processing by running the instructions stored in the internal memory 121 and/or instructions stored in the memory disposed in the processor. The instruction stored in the internal memory 121 may include an instruction that is executed by at least one of the processors and that enables the mobile phone 100 to implement the steps performed by the mobile phone in the method for obtaining download information of a device management application provided in the embodiments of this application.

A software system of the mobile phone 100 may use a layered architecture, an event-driven architecture, a microkernel architecture, a micro service architecture, or a cloud architecture. In this embodiment of the present disclosure, an Android system of the layered architecture is used as an example to describe a software structure of the mobile phone 100.

Figure 3:
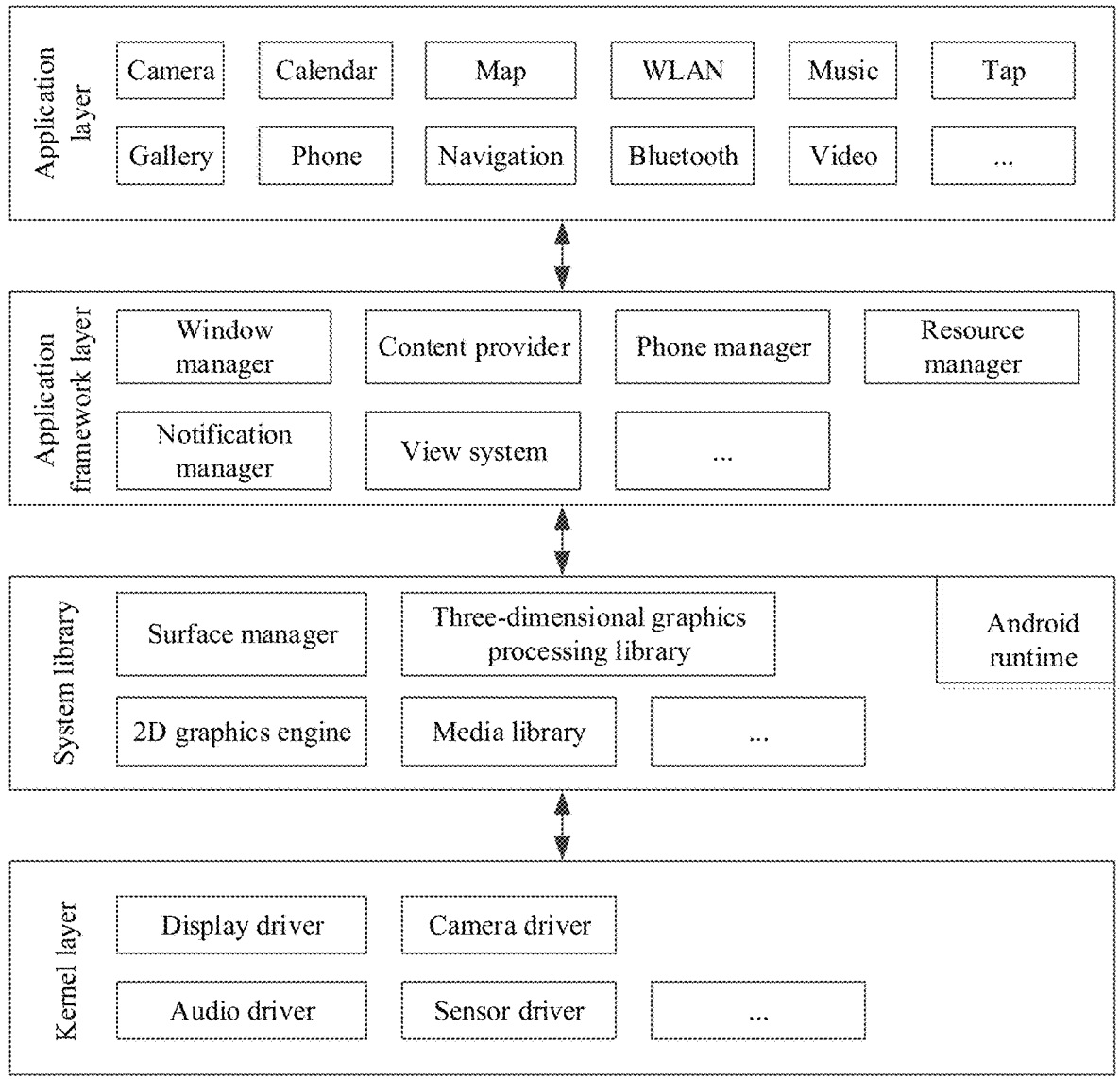
FIG. 3 is a diagram of a software architecture of a mobile phone according to an embodiment of this application.

FIG. 3 is a block diagram of the software structure of the mobile phone 100 according to an embodiment of the present disclosure.

In the layered architecture, software is divided into several layers, and each layer has a clear role and task. The layers communicate with one another through a software interface. In some embodiments, the Android system is divided into four layers: an application layer, an application framework layer, an Android runtime and system library, and a kernel layer from top to bottom.

The application layer may include a series of application packages.

As shown in FIG. 3, the application package may include applications such as Camera, Gallery, Calendar, Phone, Map, Navigation, WLAN, Bluetooth, Music, Video, and Tap. The Tap application is an NFC tag reading application, and is used to read the tag data in the NFC tag.

The application framework layer provides an application programming interface (API) and a programming framework for an application at the application layer. The application framework layer includes some predefined functions.

As shown in FIG. 3, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying an image. The view system may be configured to construct an application. A display interface may include one or more views. For example, a display interface including a notification icon of short message service messages may include a text display view and a picture display view.

The phone manager is configured to provide a communication function of the mobile phone 100, for example, management of a call status (including answering, declining, or the like).

The resource manager provides, for an application, various resources such as a localized character string, an icon, a picture, a layout file, and a video file.

The notification manager enables an application to display notification information in the status bar, and may be configured to transmit a notification-type message. The displayed information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a function that needs to be invoked in java language and a kernel library of Android.

The application layer and the application framework layer run on the virtual machine. The virtual machine executes Java files at the application layer and the application framework layer as binary files. The virtual machine is configured to perform functions such as object lifecycle management, stack management, thread management, security and exception management, and garbage collection.

The system library may include a plurality of functional modules, for example, a surface manager, a media library, a three-dimensional graphics processing library (for example, an OpenGL ES), and a 2D graphics engine (for example, an SGL).

The surface manager is configured to manage a display subsystem and provide fusion of 2D and 3D layers for a plurality of applications.

The media library supports playing and recording of a plurality of commonly used audio and video formats, static image files, and the like. The media library may support a plurality of audio and video encoding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

An embodiment of this application is used to provide a method for obtaining download information of an application. The following describes a technical solution in this embodiment of this application with reference to the example scenario shown in FIG. 1.

Figure 4:
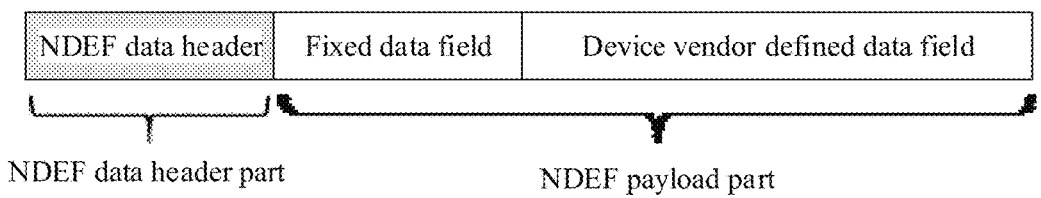
FIG. 4 is a schematic diagram depicting a data structure of NFC tag data according to an embodiment of this application.

Before a process of interaction between the mobile phone 100 and the water purifier 200 is described, an example data structure (the data structure complies with an NFC application-layer protocol (NDEF protocol)) of NFC tag data used in this embodiment of this application is first described. Refer to FIG. 4. The NFC tag data includes an NDEF data header part (e.g., an NDEF record header) and an NDEF payload part (e.g., an NDEF record payload). The NDEF data header part is in a fixed format, and the NDEF payload part is in a user-defined format.

The NDEF payload part is further divided into a fixed data field and a device vendor defined data field. The fixed data field is in a fixed format, and the device vendor defined field is in a format customized by each device vendor based on a specific service of the device vendor.

Table 1 shows a data structure of NFC tag data provided in this embodiment and a meaning of each field. The fixed data field includes vendor information of an IoT device vendor.

TABLE 1

| Partition | Field meaning | Length | Field value | Interpretation |
|---|---|---|---|---|
| NDEF data header | Header byte | 1 | 0xD2 | Indicating a position of this record in the NFC tag data, where value D2 indicates that this record is the first record in an NFC tag |
| | Type length | 1 | 0x02 | Indicating that a length of the "type" field in the data header is 2 bytes |
| | Payload length | 1 | 0x1E | Indicating that a data length of the payload part is 32 bytes |
| | Type | 2 | 0x0000 | Indicating a suitable mobile phone vendor, where value 0000 indicates that all mobile phone vendors are suitable |
| Fixed data field | Protocol version | 1 | 0x20 | Indicating a protocol version of a communications protocol (which may be a protocol customized by a user based on the NFC communications protocol) |
| | Functional option | 1 | 0x03 | Indicating option information in the communications protocol of the previous field |
| | Chip type | 1 | 0x00 | Indicating that a type of the NFC tag is a passive tag |
| | Reserved byte | 1 | 0x00 | Reserved field for future function extension |
| | Reserved byte | 1 | 0x00 | Reserved field for future function extension |
| | Vendor and device information | 4 | 0x4D445186 | Indicating vendor, category, and model information of the water purifier 200, where the first two bytes "4D44" correspond to "MD" in an ASCII code, indicating that the vendor of the water purifier 200 is "Midea", and the last two bytes "5186" indicate a category model identifier of the water purifier 200 |
| Device vendor defined field | Tag | 1 | 0x81 | Device vendor defined field |
| | Length | 1 | 0x06 | |
| | Template number | 2 | 0x0203 | Indicating a number of a template used by a format of the NFC tag data (this template may be customized by the device vendor) |
| | Reserved byte | 2 | 0x0000 | Reserved field that is not used temporarily |
| | Business information | 1 | 0x12 | Identifier of a production batch |
| | | 1 | 0x91 | Identifier of a virtual serial number |
| | Tag | 1 | 0x12 | Identifying the production batch |
| | Length | 1 | 0x04 | Length of Value-1 |
| | Value-1 | 4 | 0x00000012 | Indicating that the production batch of the water purifier 200 is 18 |
| | Tag | 1 | 0x91 | Identifying the virtual serial number |
| | Length | 1 | 0x07 | Length of Value-2 |
| | Value-2 | 7 | 0x4D441783255425 | Virtual serial number (Serial Number, SN) of the water purifier 200 |

Table 1 is an example for description of the format of the NFC tag data, and this application is not limited thereto. A person skilled in the art may set the format of the NFC tag data in another manner. For example, some fields are added or deleted (for example, the "chip type" field is deleted, and the "vendor and device information" field is split into two fields: "vendor information" and "device information"), the length of the field is changed (for example, the length of the vendor and device information field is increased to indicate richer category/model information), and the definition of the field is changed (for example, the meaning of the "type" field in the NDEF data header is changed to indicate IoT device vendor information).

The virtual serial number of the IoT device is written in the NFC tag. For different NFC tags, virtual serial numbers written in the NFC tags are different values, and data of each NFC tag is different. Therefore, the NFC tag may be used as a "tag" of the IoT device.

In this embodiment, the "virtual serial number" of the device is a term that is different from and associated with the "product serial number" of the device. The following first describes the meaning of the product serial number, and then describes a relationship between the two.

The product serial number is a number that is allocated by an IoT device vendor to the IoT device in a production process of the IoT device and that is used to uniquely identify the IoT device. After the IoT device is sold, the user may perform validity verification on the IoT device based on the product serial number of the IoT device, perform anticounterfeiting authentication on the IoT device, or the like. Generally, a user may see the product serial number (which may be a serial number represented in a form of a bar code) of the IoT device on a body of the IoT device, or read the product serial number of the IoT device from an embedded control chip of the IoT device.

For example, the IoT device vendor allocates the product serial number to the IoT device based on a vendor identifier, a category identifier, a model identifier, and a production serial number of the IoT device. The water purifier 200 is used as an example. A product serial number allocated by an IoT device vendor to the water purifier 200 is Mros-4 1002, where M is a vendor identifier of the water purifier 200, ros-4 is the category model identifier of the water purifier 200 ("ros" represents a reverse osmosis filtering water purifier, and "4" represents four-level filter element filtering), and 1002 represents a production serial number of the water purifier 200.

In this specification, an "identifier" of an attribute of the IoT device may be used to uniquely determine this attribute of the IoT device. For example, the category identifier of the IoT device may be used to uniquely determine a category that the IoT device belongs to, and the vendor identifier of the IoT device may be used to uniquely determine the vendor of the IoT device. Based on this, a specific implementation form of the "identifier" is not limited in this specification. The "identifier" may be in a plaintext form (for example, the vendor identifier "MD" represents "Midea"), or may be in a ciphertext form (for example, "5186" in the "vendor and device information" field in Table 1 is the category model identifier presented in the ciphertext form, and after decoding "5186", the IoT device vendor may uniquely determine a category and a model of the water purifier 200). The "identifier" may include a digit, a letter, a symbol, or a combination thereof. This is not limited in this application.

In addition, the category identifier and the model identifier of the IoT device may be presented in a combined form. In this specification, an identifier presented in this form is referred to as the "category model identifier". The category model identifier includes no specific category identifier field or model identifier field, but is used as a whole instead to identify the category and the model of the IoT device. For example, "ros-4" is used as a whole to identify the corresponding IoT device as a reverse osmosis filtering water purifier using level-4 filter element filtering.

The following describes the relationship between the "virtual serial number" of the device and the "product serial number" of the device based on the production process of the water purifier.

In the production process, the water purifier and the NFC tag are completed in different factories or on different production lines. Before the water purifier is delivered, the water purifier needs to be combined with the NFC tag (for example, the NFC tag is attached to the body of the water purifier, or the NFC tag is placed in a package of the water purifier), and then the two are assembled before delivery.

If the product serial number of the water purifier is written in the "Value-2" field of the NFC tag, when the water purifier is combined with the NFC tag, there is a problem of how to make the two in a one-to-one correspondence. For example, for 1000 water purifiers whose product serial numbers are Mros-4 1001 to Mros-4 2000 and 1000 NFC tags whose "Value-2" are Mros-4 1001 to Mros-4 2000, it is necessary to combine the water purifier whose product serial number is Mros-4 1001 with the NFC tag whose "Value-2" is Mros-4 1001, then combine the water purifier whose product serial number is Mros-4 1002 with the NFC tag whose "Value-2" is Mros-4 1002, and so on. It may be understood that in an actual production process, such an operation will greatly reduce production efficiency.

Therefore, in this embodiment, a manner of writing the virtual serial number of the IoT device in the NFC tag is used. In this embodiment, the virtual serial number in the NFC tag is determined in a manner of the vendor identifier+ the category identifier+a random number. For example, the virtual serial number in the NFC tag of the water purifier 200 is 0x4D441783255425, where the first two bytes "4D44" correspond to "MD" of the ASCII code, indicating the vendor identifier of a vendor of the water purifier; the third byte "17" is the category identifier of the water purifier 200; and the subsequent bytes "83255425" are random numbers generated according to a random number generation algorithm. A virtual serial number coding rule provided in this embodiment not only helps quickly map the virtual serial number to the product serial number of the device (a reason is specifically described in step S130 below), but also helps improve information security because the virtual serial number includes a random number part.

In another embodiment, the virtual serial number in the NFC tag may be determined in another manner. For example, device classification information (for example, device model information) that is more detailed than category information is written in the virtual serial number. Alternatively, the virtual serial number does not include the vendor identifier and the category identifier, and all bytes of the virtual serial number are generated by using a random number algorithm. Alternatively, the random number part of the virtual serial number is replaced with write time of the tag data. Enumerations are omitted as long as virtual serial numbers in NFC tags are different from each other.

According to the method for determining a virtual serial number provided in this application, when the water purifier is combined with the NFC tag, any NFC tag (that is, an NFC tag including a virtual serial number whose first two bytes are "17") for the water purifier may be combined with any water purifier, so that combination difficulty can be greatly reduced, and combination efficiency can be improved. After the water purifier 200 and the NFC tag are combined, the product serial number and the virtual serial number of the water purifier are recorded in an IoT device vendor server, and a mapping relationship between a product serial number and a virtual serial number of each water purifier is established (refer to Table 2). According to the method provided in this embodiment, an association between the product serial number and the virtual serial number of the water purifier can be conveniently established, which, compared with the manner of writing the product serial number of the water purifier in NFC, can significantly reduce operation difficulty.

The product serial number in the form of a bar code is used as an example to describe how to associate the product serial number and the virtual serial number of the water purifier. In this example, a bar code is attached to the body of the water purifier, and the product serial number of the water purifier is written in the bar code. After the water purifier and the NFC tag are combined, an operator may read the product serial number of the water purifier by using a bar code scanner, write the read product serial number into an $i^{th}$ row in the "product serial number" column in Table 2, read the NFC tag data by using an NFC tag reader, and write the read NFC tag data into the $i^{th}$ row in the "virtual serial number" column in Table 2, so as to establish the association between the product serial number and the virtual serial number of the water purifier. Operations are easy to complete.

It is to be noted that, in this embodiment, a mapping relationship between a product serial number and a virtual serial number is established in a form of a table (in Table 2, a product serial number and a virtual serial number that are located in a same row are associated with each other). However, this application is not limited thereto. The mapping relationship between a product serial number and a virtual serial number may also be established in another form. For example, the product serial number and the virtual serial number that are associated with each other point to a same correlative code, and the correlative code may be used to determine the product serial number and the virtual serial number that are associated with each other.

TABLE 2

| Category | Product serial number | Virtual serial number |
|---|---|---|
| Water purifier | Mros-4 1001 | 0x1724862546 |
|  | Mros-4 1002 | 0x1783255425 |
|  | Mros-4 1003 | 0x1724057104 |
|  | Mros-4 2000 | 0x1745145202 |
| Air conditioner | Mkl-2 5001 | 0x2754842665 |
|  | Mkl-2 5001 | 0x2714532245 |
|  | Mkl-2 5500 | 0x2714523554 |

The data structure of the tag data in the NFC tag provided in this embodiment is described above. The following describes the method for obtaining download information of an application provided in this embodiment.

Embodiment 1

Figure 5:
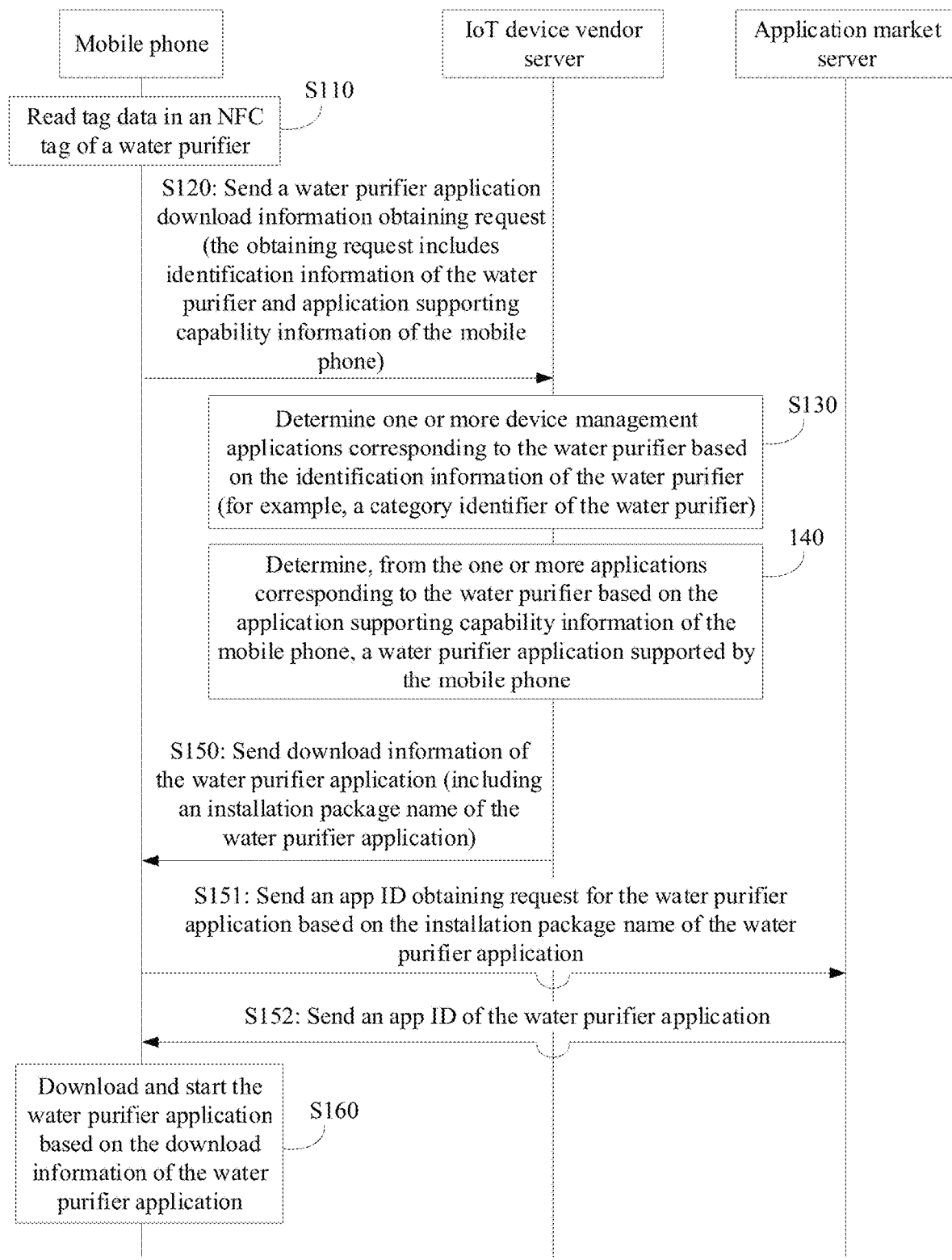
FIG. 5 is a schematic flowchart 1 of a method for obtaining download information of a device management application according to an embodiment of this application.

Refer to FIG. 5. This embodiment is used to provide a method for obtaining download information of an application, including the following steps.

S110: A mobile phone 100 (used as a first device) reads tag data in an NFC tag 201 of a water purifier 200 (used as a second device).

Figure 6:
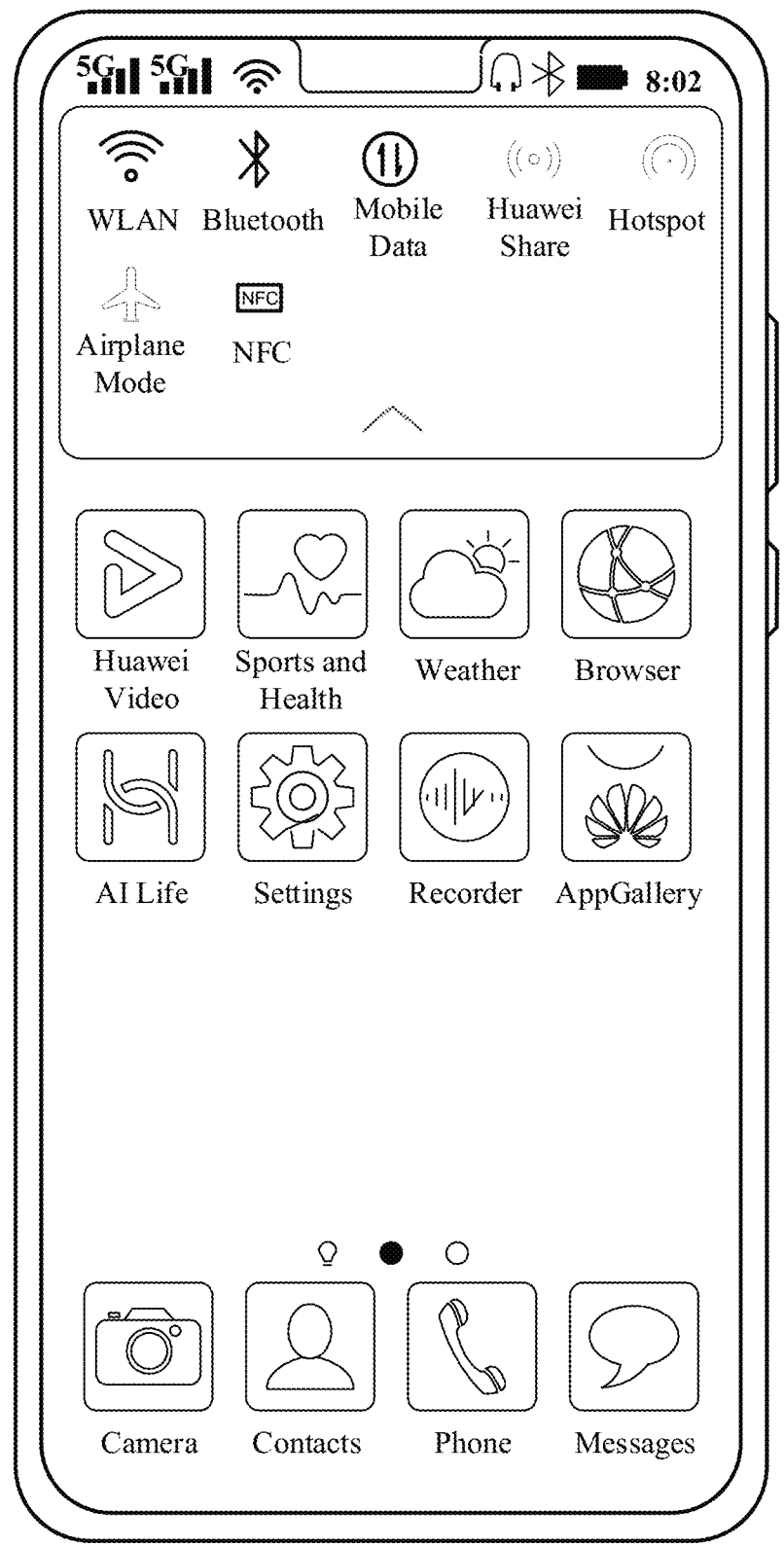
FIG. 6 is a schematic diagram of an NFC switch of a mobile phone according to an embodiment of this application.

The mobile phone 100 reads the tag data in the NFC tag 201 by using an NFC tag reading application installed in the mobile phone 100. When an NFC switch of the mobile phone 100 is turned on (a user may turn on the NFC switch in a manner shown in FIG. 6, or turn on the NFC switch in a system application menu "Settings"), if the mobile phone 100 is close to the NFC tag 201 of the water purifier 200 or lightly touches the NFC tag 201 of the water purifier 200 (as shown in FIG. 1), the NFC tag reading application in the mobile phone 100 may read the tag data (that is, data in a "field value" column in Table 1) in the NFC tag 201.

After reading the tag data in the NFC tag, the NFC tag reading application parses a "vendor and device information" field of the tag data to obtain a device vendor identifier (this device vendor is referred to as vendor A in this specification) of the water purifier 200.

S120: The mobile phone 100 sends a water purifier application download information obtaining request (used as a first request) to an IoT device vendor server (used as a second server), where the obtaining request includes identification information of the water purifier 200 in the NFC tag data and application supporting capability information of the mobile phone 100.

First, the NFC tag reading application obtains the application supporting capability information of the mobile phone 100. For example, the NFC tag reading application obtains the application supporting capability information of the mobile phone 100 from an operating system of the mobile phone 100 or from the system application "Settings" of the mobile phone 100. In this embodiment, the application supporting capability information of the mobile phone 100 is used to determine an application capable of running on the mobile phone 100, and is specifically one or more of the following: vendor information (for example, Huawei) of the mobile phone 100, brand information (for example, P40) of the mobile phone 100, a name and/or version information (for example, EMUI 11.0) of the operating system of the mobile phone 100, and the like.

Then, the NFC tag reading application sends the application supporting capability information of the mobile phone 100 and the identification information of the water purifier 200 to the IoT device vendor server, to send the water purifier application download information obtaining request to the IoT device vendor server. Specifically, the NFC tag reading application sends the information to the IoT device vendor server by using a tag parsing SDK (used as a first SDK) integrated in the NFC tag reading application.

A tag parsing SDK may parse the tag data in the NFC tag, and may be used as a communication interface for the NFC tag reading application to communicate with the outside. The tag parsing SDK includes a service request address of the IoT device vendor server. The NFC tag reading application may send, by using the tag parsing SDK, the information to the IoT device vendor server corresponding to the service request address. In this embodiment, the tag parsing SDK is an SDK provided by an IoT device vendor for a mobile phone vendor. After receiving the tag parsing SDK from the IoT device vendor, the mobile phone vendor integrates the tag parsing SDK into the NFC tag reading application in the mobile phone 100.

Figure 7:
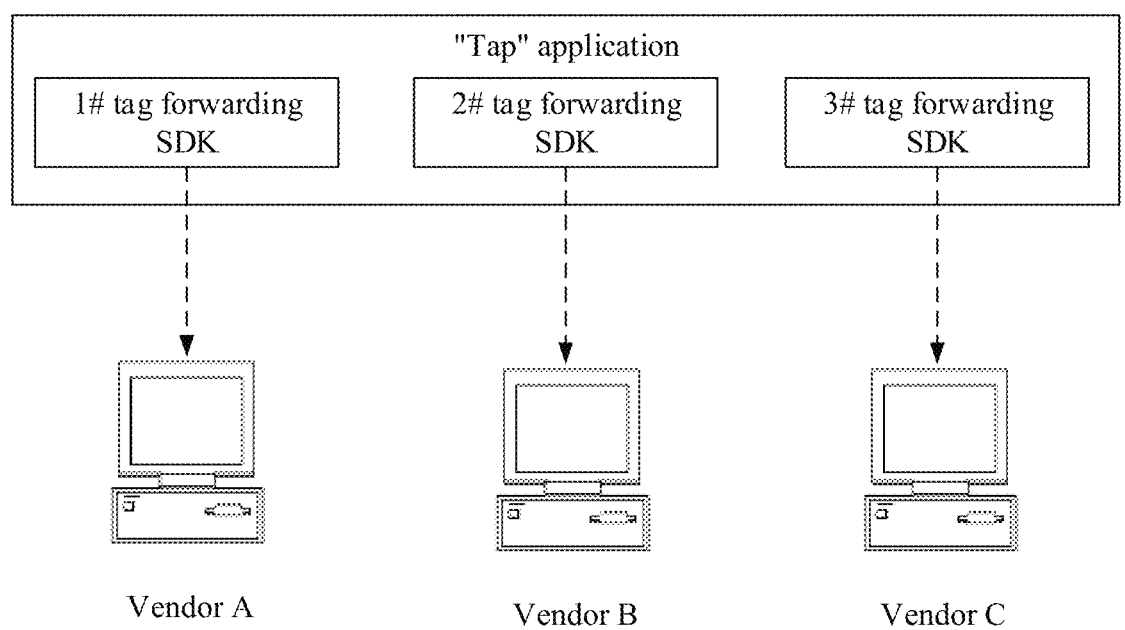
FIG. 7 is a schematic diagram of setting a tag parsing SDK according to an embodiment of this application.

Refer to FIG. 7. A plurality of tag parsing SDKs may be integrated into the NFC tag reading application, and the tag parsing SDKs correspond to different IoT device vendors (service request addresses of different IoT device vendor servers are written), so as to send data to different IoT device vendor servers.

In addition, the tag parsing SDK has a tag parsing function, and may parse the NFC tag of the IoT device vendor corresponding to the tag parsing SDK. For example, a 1#tag parsing SDK may parse the NFC tag 201 of the water purifier 200 produced by vendor A, to obtain the identification information of the water purifier 200 written in the NFC tag 201. In this embodiment, the identification information of the water purifier 200 includes a vendor identifier and a category model identifier (that is, data in the "vendor and device information" field in Table 1) of the water purifier 200, and a virtual serial number of the water purifier 200. This application is not limited thereto. In another embodiment, the identification information of the water purifier 200 includes one or more of the following: a category identifier of the water purifier 200, a model identifier of the water purifier 200, and a virtual serial number of the water purifier 200.

When sending the data to the IoT device vendor server, the NFC tag reading application determines, based on the IoT device vendor identifier obtained through parsing in step S110, a destination IoT device vendor (namely, vendor A) for receiving the data, so as to transfer the tag data in the NFC tag 201 to the 1#tag parsing SDK corresponding to vendor A. After receiving the tag data, the 1#tag parsing SDK parses the tag data to obtain the identification information of the water purifier 200 written in the NFC tag 201.

Then, the 1#tag parsing SDK sends the identification information of the water purifier 200 and the application supporting capability information of the mobile phone 100 to the server of "vendor A".

S130: The IoT device vendor server determines, based on the identification information of the water purifier 200, a device management application corresponding to the water purifier 200.

In this embodiment, IoT devices of a same category correspond to a same device management application (which may correspond to a same device management application, or may correspond to a same group of device management applications). That is, when a plurality of IoT devices belong to a same category (for example, belong to a same water purifier category), even if models of the plurality of IoT devices are different (for example, some water purifiers are reverse osmosis water purifiers, and some other water purifiers are ultrafiltration water purifiers), the plurality of IoT devices still correspond to a same device management application. However, when the IoT devices belong to different categories, the IoT devices correspond to different device management applications. For example, a water purifier and an air conditioner correspond to different device management applications.

The IoT device vendor server stores a mapping relationship between a category of an IoT device and a device management application. In this way, after determining a category that the IoT device belongs to, the IoT device vendor server may determine, based on the mapping relationship, the device management application corresponding to the IoT device.

After receiving the identification information of the water purifier 200, the IoT device vendor server determines, based on the identification information of the water purifier 200, one or more (a group of) device management applications corresponding to the water purifier 200. In this embodiment, the identification information of the water purifier 200 includes a virtual serial number of the water purifier 200 and a category model identifier of the water purifier 200. The following provides specific examples in which the IoT device vendor server determines the device management application corresponding to the water purifier 200.

Example 1: The IoT device vendor server determines, based on the category model identifier of the water purifier 200, the device management application corresponding to the water purifier 200.

Refer to Table 1. In the NFC tag of the water purifier 200, the category model identifier of the water purifier 200 is "5186". As described above, the identifier is an identifier presented in a ciphertext form. After receiving the identification information of the water purifier 200, the IoT device vendor server decodes "5186" by using an encoding rule customized by the vendor, to determine that an IoT device corresponding to "5186" is a water purifier of a model "ros-4". Then, the IoT device vendor server determines, based on the locally stored mapping relationship between a category of an IoT device and a device management application, that a device management application corresponding to a "water purifier" category is an application in Table 3 (that is, the device management application corresponding to the water purifier 200).

Example 2: The IoT device vendor server determines the device management application based on the virtual serial number of the water purifier 200.

After receiving the virtual serial number of the water purifier 200, the IoT device vendor server determines, by querying a mapping relationship table (Table 2) between a product serial number and a virtual serial number of a device, a product serial number (Mros-4 1002) corresponding to the virtual serial number. After the product serial number of the IoT device is determined, the device management application (an application listed in Table 3) corresponding to the IoT device is determined based on the category (that is, water purifier) that the IoT device belongs to.

In a process of querying the product serial number, it may be first determined, based on a third byte "17 (that is, category identifier)" of the virtual serial number, that the category of the IoT device is "water purifier", so that a query range can be narrowed down to an entry corresponding to "water purifier 200", to accelerate mapping of the virtual serial number to the product serial number.

In some other embodiments, after receiving the virtual serial number of the water purifier 200, the IoT device vendor server determines, based on the third byte "17 (that is, category identifier)" of the virtual serial number, that the category of the IoT device is "water purifier", so as to determine, based on the category that the IoT device belongs to, that the device management application corresponding to the IoT device is the application listed in Table 3.

In some other embodiments, the IoT device vendor server stores a mapping relationship between a virtual serial number and a device management application. In this case, the device management application corresponding to the IoT device may be directly queried based on the virtual serial number.

Example 3: The IoT device vendor server concurrently executes the manners provided in Example 1 and Example 2. When a determining result of the device management application is obtained in one of the manners faster than the other, the determining result is used as the device management application corresponding to the IoT device. In this example, the device management application may be determined as quickly as possible by concurrently executing Example 1 and Example 2.

In this embodiment, IoT devices of a same category correspond to a same device management application. However, this application is not limited thereto. In another embodiment, the device management application may be further subdivided. That is, IoT devices of different models in a same category correspond to different device management applications. For example, a reverse osmosis water purifier and an ultrafiltration water purifier correspond to different device management applications. In this case, the IoT device vendor server stores a mapping relationship between a model of an IoT device and a device management application. Accordingly, the IoT device vendor server determines, based on the model of the IoT device, the device management application corresponding to the IoT device.

For example, after decoding the category model identifier "5186" of the water purifier 200, the IoT device vendor server determines, based on the model "ros-4 (reverse osmosis water purifier)" of the water purifier 200, the device management application corresponding to the water purifier 200. For another example, the IoT device vendor server determines the product serial number (Mros-4 1002) of the water purifier 200 based on the virtual serial number of the water purifier 200, and determines the model "ros-4 (reverse osmosis water purifier)" of the water purifier 200 based on the product serial number of the water purifier 200, so as to determine the device management application corresponding to the water purifier 200.

In this embodiment, for the device management application that is determined by the IoT device vendor server and corresponds to the water purifier 200, refer to Table 3.

TABLE 3

| Application name and version | Application installation package name | Application type | Suitable operating system | Mobile phone brand | Mobile phone vendor |
|---|---|---|---|---|---|
| Water purifier (EMUI version) | com.companyname.purifier01 | Quick application | EMUI | Mate | Huawei |
| Water purifier (MIUI version) | com.companyname.purifier03 | Quick application | MIUI | Redmi | Xiaomi |
| Smart home (iOS) | com.companyname.smartpd03 | Conventional app | iOS | iPhone | Apple |
| Smart home (Android 2.0) | com.companyname.smartpd02 | Conventional app | Android 9.0 or later | Galaxy | Samsung |
| Smart home (Android 1.0) | com.companyname.smartpd01 | Conventional app | Earlier than Android 9.0 | | |

The "conventional app" is an app (for example, WeChat™ or Alipay™) that can be supported by an iOS system or an Android native system, and is an app installed with participation of a user. A process of installing this type of app is generally as follows: After downloading an installation package of this type of app from an application market, the user taps an "install" button, so as to install the app in the mobile phone.

The "quick application" is an installation-free application. After downloading an installation package of this type of application, the mobile phone automatically installs the application, providing a click-to-run experience for the user.

In addition, "companyname" in a name of an installation package of an application is a vendor identifier, and a vendor that provides the application may be identified by using the vendor identifier.

S140: The IoT device vendor server determines, based on the application supporting capability information of the mobile phone 100, a water purifier application suitable for the mobile phone 100.

As shown in Table 3, in consideration of system compatibility (for example, an application for an Android system may be incompatible with the iOS system, and a quick application may be incompatible with the Android native system), business purposes, and the like, one IoT device may correspond to a plurality of device management applications. In this embodiment, after a plurality of water purifier applications corresponding to the water purifier 200 are determined, the IoT device vendor server then selects, from the plurality of water purifier applications based on the application supporting capability information of the mobile phone 100, an application applicable to the mobile phone 100 (that is, an application that can be installed and run in the mobile phone 100).

In this embodiment, the application applicable to the mobile phone 100 is determined based on the operating system of the mobile phone 100. For example, the operating system of the mobile phone 100 is EMUI. Therefore, the IoT device vendor server determines that the water purifier application applicable to the mobile phone 100 is the "water purifier (EMUI version) (the application is a quick application)".

This application is not limited thereto. In another embodiment, the IoT device vendor server may determine, based on other application supporting capability information, the device management application applicable to the mobile phone 100. For example, in some cases, there is a clear correspondence between a brand of a mobile phone and an operating system of the mobile phone. In this case, the device management application applicable to the mobile phone 100 may be determined based on a brand of the mobile phone 100. In some other cases, there is a clear correspondence between the vendor of the mobile phone 100 and an operating system of the mobile phone 100. In this case, the device management application applicable to the mobile phone 100 may be determined based on the vendor of the mobile phone 100 (for example, the device management application is determined as "smart home (iOS)" based on the vendor "Apple").

The foregoing is an example of determining the water purifier application. A person skilled in the art may make other variations, for example, swap a sequence of step S130 and step S140. That is, the applications applicable to the mobile phone 100 are first determined based on the application supporting capability information of the mobile phone 100, and then the application corresponding to the water purifier 200 is selected based on the identification information of the water purifier 200 from the applications applicable to the mobile phone 100.

S150: The IoT device vendor server sends download information (used as a first request response) of the water purifier application (the "water purifier") to the mobile phone 100.

In this embodiment, the download information sent by the IoT device vendor server to the mobile phone 100 is used to provide a way for the mobile phone 100 to download the "water purifier". That is, the mobile phone 100 may download an installation package of the "water purifier" based on the download information received from the IoT device vendor server. Based on this, a specific form of the download information is not limited in this embodiment. The following provides several specific examples.

Example 1: The download information sent by the IoT device vendor server to the mobile phone 100 is an installation package name (com.companyname.purifier01.apk) of the "water purifier". When the "water purifier" is a conventional app, the mobile phone 100 may download the installation package of the "water purifier" based on the installation package name of the "water purifier".

Example 2: The download information sent by the IoT device vendor server to the mobile phone 100 is an installation package name of the "water purifier" and a URL download address of the "water purifier" (for example, the URL download address of the "water purifier" is a download address of the "water purifier" application on an official website of the water purifier vendor). In this example, the mobile phone 100 may download the installation package of the "water purifier" from the URL download address of the "water purifier".

For Example 1 and Example 2, after receiving the download information of the "water purifier" from the IoT device vendor server, the mobile phone 100 may further request, from an application market server (for example, a Huawei AppGallery server) based on the installation package name of the "water purifier", a unique identifier of the "water purifier" in the application market, that is, an app ID (used as an application ID). Specifically, after receiving the installation package name of the "water purifier" from the IoT device vendor server, the mobile phone 100 sends, to the application market server (used as a third server), an app ID obtaining request carrying the installation package name of the "water purifier" (step S151 in FIG. 5, used as a third request). After receiving the app ID obtaining request, the application market server queries the app ID of the "water purifier" in the application market based on the installation package name of the "water purifier", and returns the app ID of the "water purifier" to the mobile phone (step S152 in FIG. 5, used as a third request response). After obtaining the app ID of the "water purifier", the mobile phone 100 may download the installation package of the "water purifier" from the application market based on the app ID.

In this embodiment, the mobile phone 100 may receive, by using the tag parsing SDK (specifically, the 1#tag parsing SDK), the download information of the "water purifier" sent by the IoT device vendor server, send the app ID obtaining request to the application market server, and receive the app ID of the "water purifier" returned by the application market server to the mobile phone.

Example 3: The download information sent by the IoT device vendor server to the mobile phone 100 is an installation package name of the "water purifier" and an app ID of the "water purifier". In this example, the mobile phone 100 may download the installation package of the "water purifier" from the application market based on the app ID.

Example 4: The download information sent by the IoT device vendor server to the mobile phone 100 is an installation package name of the "water purifier", an app ID of the "water purifier", and a URL download address of the "water purifier". In this example, the mobile phone 100 may download the installation package of the "water purifier" from the application market based on the app ID, or download the installation package of the "water purifier" based on the URL download address of the "water purifier". To improve application download security, the mobile phone 100 preferentially downloads the installation package of the "water purifier" from the application market.

For Example 3 and Example 4, the app ID sent by the IoT device vendor server to the mobile phone 100 may be an app ID locally stored in the IoT device vendor server, or may be an app ID requested by the IoT device vendor server from an application market server based on the installation package name of the "water purifier" before sending the download information of the "water purifier" to the mobile phone 100.

In addition, for the foregoing Example 1 to Example 4, the download information sent by the IoT device vendor server to the mobile phone 100 may further include version information of the "water purifier", so that the mobile phone 100 updates a version of the "water purifier".

S160: The mobile phone 100 downloads and starts the "water purifier" based on the download information of the "water purifier". Specifically, after receiving the download information of the "water purifier", the mobile phone 100 starts the "water purifier" by using the NFC tag reading application. For a method for starting the "water purifier" by the NFC tag reading application, refer to a method for starting an application by a mobile phone in a conventional technology, for example, a method for downloading and starting an application (in this case, the application is a conventional app) by the Android native system by using an installation package name of the application, or a method for downloading and starting an application (in this case, the application is an applet or a quick application) by an EMUI or MIUI system by using an app ID or a URL download address of the application.

The following describes an example of a process in which the mobile phone 100 starts the "water purifier". In this embodiment, the "water purifier" is a quick application. Therefore, the mobile phone 100 downloads and starts the "water purifier" by using the app ID or the URL download address of the "water purifier".

To improve security of an application download process, the mobile phone 100 preferentially downloads and starts the "water purifier" by using the app ID of the "water purifier". In other words, when the download information sent by the IoT device to the mobile phone 100 includes the app ID of the "water purifier", or when the mobile phone 100 successfully obtains the app ID of the "water purifier" from the application market server, the mobile phone 100 downloads and starts the "water purifier" by using the app ID of the "water purifier". Otherwise, the mobile phone 100 downloads and starts the "water purifier" by using the URL download address of the "water purifier".

The following describes, as an example, a process in which the mobile phone 100 downloads and starts the "water purifier" by using the app ID of the "water purifier". The process is specifically as follows: The NFC tag reading application transfers the app ID and the installation package name of the "water purifier" to the operating system, and sends, to the operating system by invoking an API function (for example, a startActivity( ) function or a startAbility( ) function) provided by the operating system, a request for starting the "water purifier" application. After receiving the request for starting the "water purifier" application, the operating system determines whether there is the installation package of the "water purifier" on the mobile phone 100. If there is the installation package of the "water purifier", the operating system starts the "water purifier" application by using the installation package name of the "water purifier". If there is no installation package of the "water purifier", the operating system downloads the installation package of the "water purifier" from the application market by using the app ID of the "water purifier", and starts the "water purifier" application according to the installation package name of the "water purifier".

Figure 8A:
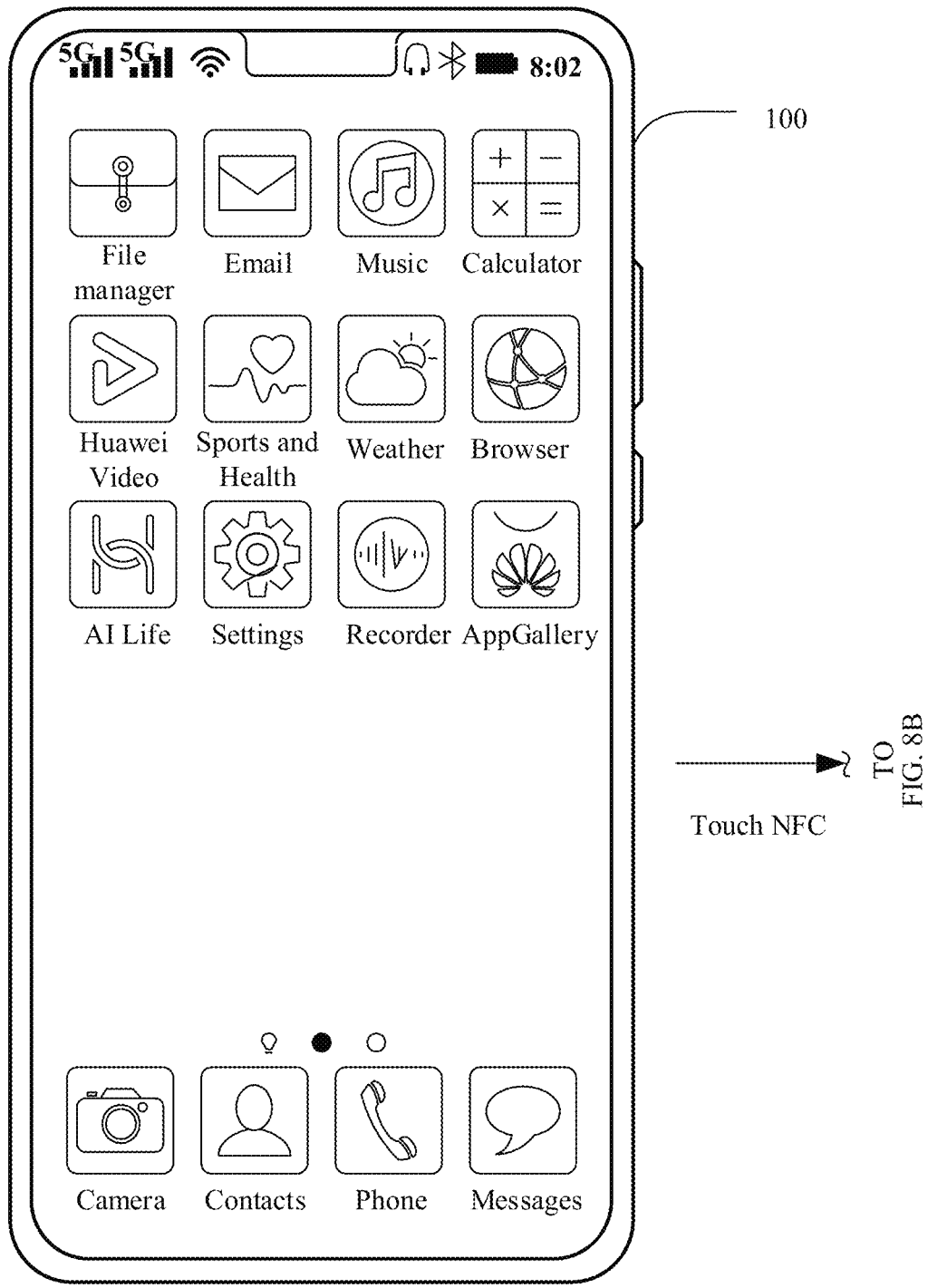
FIG. 8A to FIG. 8C are a schematic diagram of an implementation effect of a method according to an embodiment of this application.
Figure 8B:
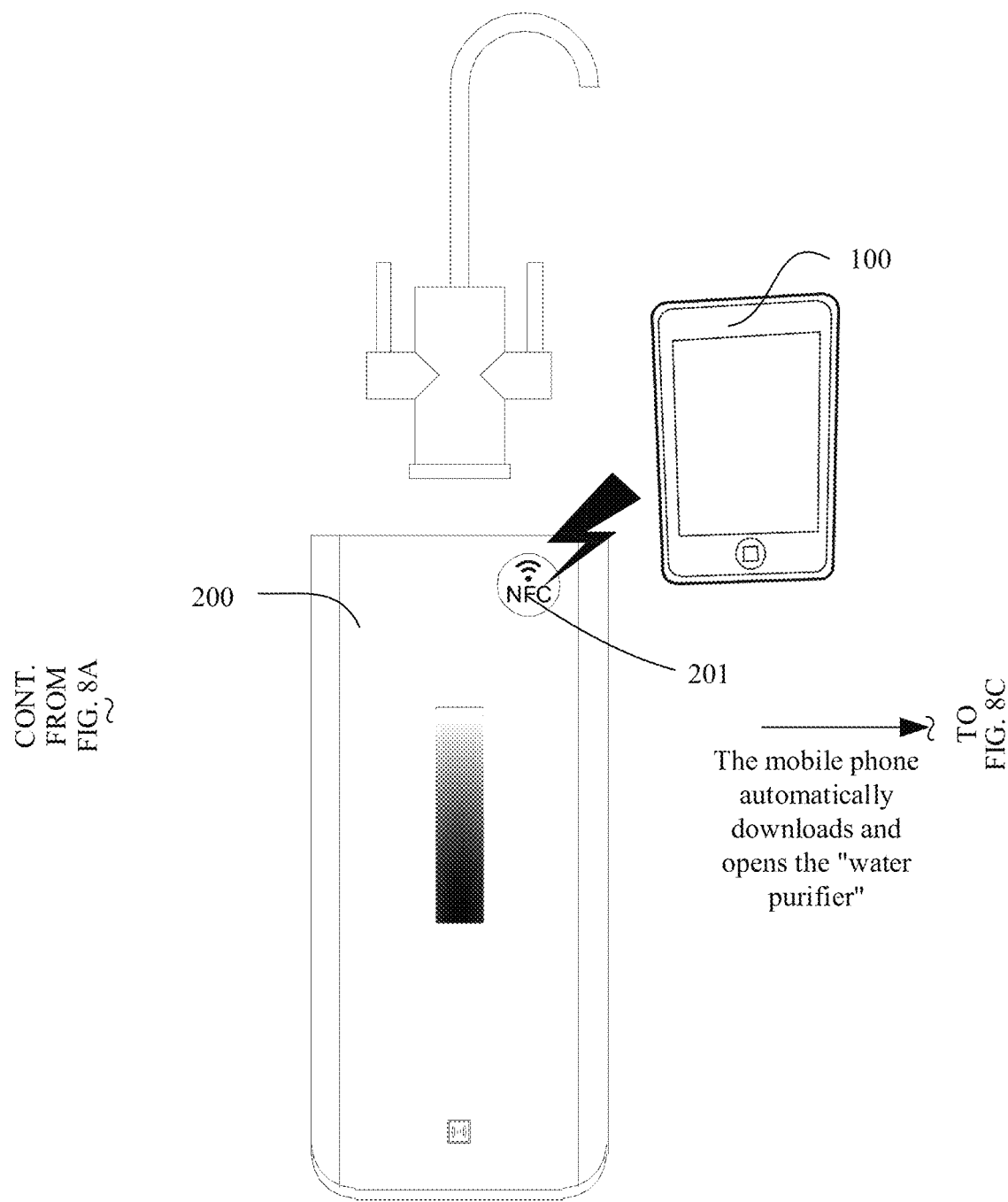
Figure 8C:
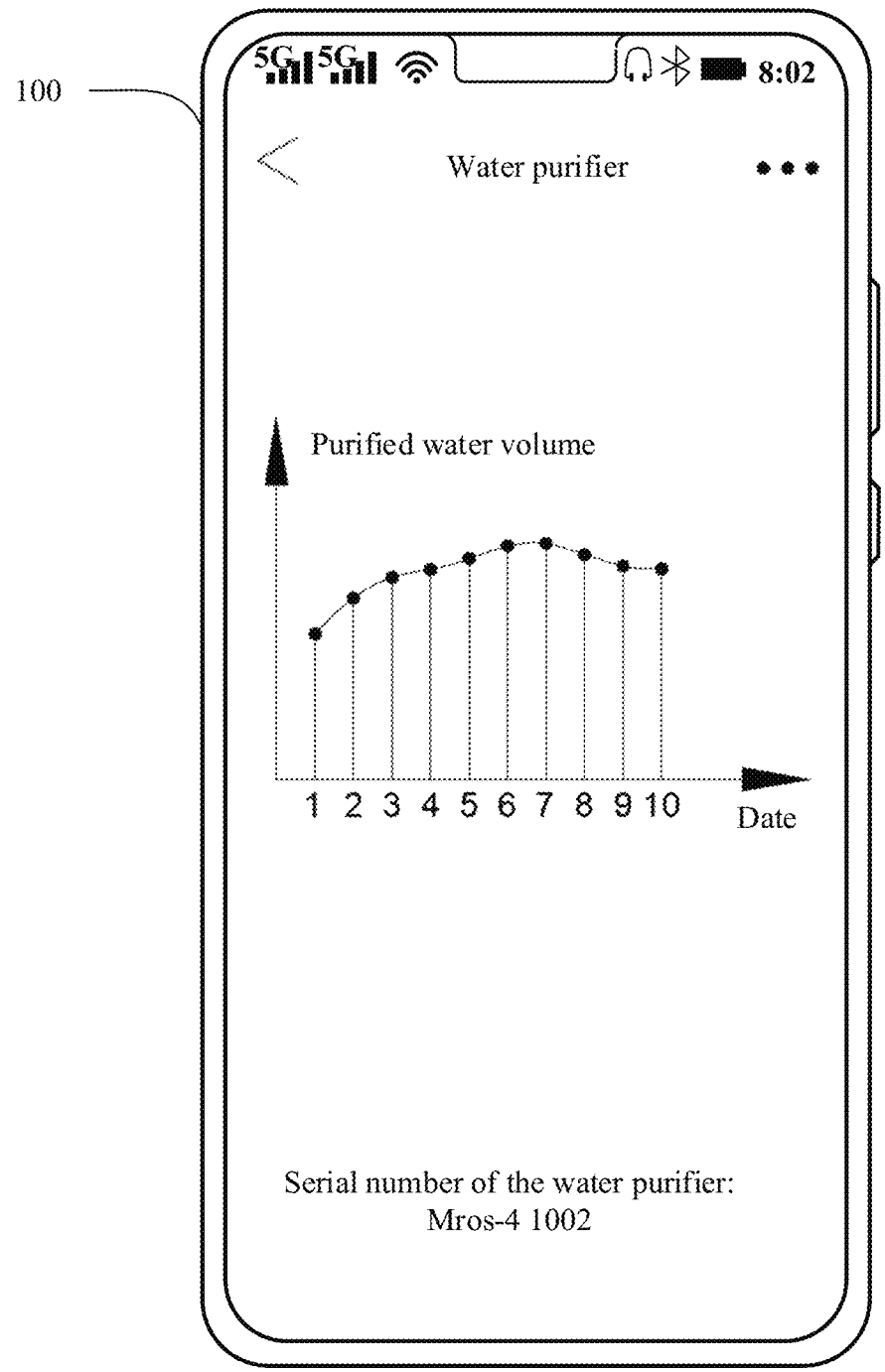

In this embodiment, the "water purifier" is a quick application. Therefore, according to the method provided in this embodiment, after the user lightly touches the NFC tag of the water purifier 200 by using the mobile phone 100, the mobile phone 100 downloads and automatically starts the water purifier application in a user-unaware manner, to provide the user with experience of "starting the application with one touch". For example, refer to FIG. 8A to FIG. 8C. In an unlocked state of the mobile phone 100, when the user touches the NFC tag 201 of the water purifier 200 by using the mobile phone 100, the mobile phone 100 automatically downloads and opens the "water purifier". In another embodiment, the user may also enable the mobile phone 100 to touch the NFC tag 201 of the water purifier 200 in another state of the mobile phone 100 (for example, when an interface of another app is displayed or when a screen of the mobile phone is locked), to open the "water purifier".

In addition, after downloading the "water purifier", the mobile phone 100 may further display an icon (usually displayed on a leftmost screen of the mobile phone 100) of the "water purifier" on a home screen of the mobile phone 100. Therefore, the user may tap the icon of the "water purifier" to start the application, adding a way of starting the application. However, this application is not limited thereto. In another embodiment, the "water purifier" may be a conventional app.

In this embodiment, the user may further attach the NFC tag of the water purifier 200 to a place (for example, a dining table, a tea table, or a writing desk) outside the water purifier 200 as required, or the user may carry around the NFC tag of the water purifier 200. In this way, the user may operate the mobile phone 100 to read the NFC tag 201 of the water purifier at any time to start the "water purifier", thereby improving user experience.

In addition, after obtaining the download information of the "water purifier" (including the download information of the "water purifier" sent by the IoT device vendor server to the mobile phone 100 and/or the app ID of the "water purifier" obtained by the mobile phone 100 from the application market server), the mobile phone 100 may store a mapping relationship between the NFC tag data of the water purifier 200 and the download information of the "water purifier" in a local "tag-application" mapping table of the mobile phone 100. "Tag" in "tag-application" represents the tag data in the NFC tag, and "application" represents the download information of the "water purifier" application. In this way, when reading the NFC tag next time, the mobile phone 100 may start the "water purifier" based on the download information of the "water purifier" stored in the "tag-application" mapping table, to improve an application startup speed of the mobile phone 100.

In conclusion, in this embodiment, after receiving the application download information obtaining request from the mobile phone 100, the IoT device vendor server determines, based on the identification information of the water purifier 200 and the application supporting capability information of the mobile phone 100, the water purifier application that can be run by the mobile phone 100, and returns the download information of the water purifier application to the mobile phone 100. In other words, in this application, the download information of the water purifier application is maintained by using the IoT device vendor server, instead of being maintained by using the NFC tag as in the conventional technology. In this way, regardless of how the download information of the water purifier application is updated, the IoT device vendor server can return real-time and effective application download information to the mobile phone 100, thereby resolving the problem of inflexible maintenance of application download information in a conventional technology.

In addition, in this application, the IoT device vendor server determines a current version of the water purifier application based on the identification information of the water purifier 200 and the application supporting capability information of the mobile phone 100. Therefore, the user may not need to care about a version upgrade problem, and user experience is improved.

It is to be noted that the method for obtaining download information of a device management application provided in this embodiment is described as an example of the technical solutions of this application, and a person skilled in the art may make other variations.

For example, in some embodiments, a carrier of the tag data may be another data carrier other than NFC, for example, a two-dimensional code, a bar code, or an RFID tag. Correspondingly, the mobile phone 100 may read the tag data in the tag by using another application. For example, when the carrier of the tag data is the two-dimensional code, the mobile phone 100 may read the tag data in the tag by using a two-dimensional code image reading application (for example, a "scan" application).

For another example, in some embodiments, after determining the product serial number of the water purifier 200 based on the NFC tag data (for example, determining the product serial number of the water purifier 200 in step S130), the IoT device vendor server sends the product serial number of the water purifier 200 to the mobile phone 100 for the mobile phone 100 to use in another service associated with the water purifier. For example, in a network configuration service, a device that currently requests pairing with the mobile phone 100 is checked based on a product serial number sent by an IoT device vendor server.

Embodiment 2

This embodiment is based on Embodiment 1. Based on Embodiment 1, the following variation is made in this embodiment: After reading the tag data in the NFC tag of the water purifier, the mobile phone 100 queries, in the locally stored "tag-application" mapping table, whether there is application download information corresponding to the NFC tag data. When the application download information corresponding to the NFC tag data exists in the "tag-application" mapping table, the water purifier application is started by using the application download information, to improve an application startup speed of the mobile phone 100, thereby improving user experience.

Figure 9:
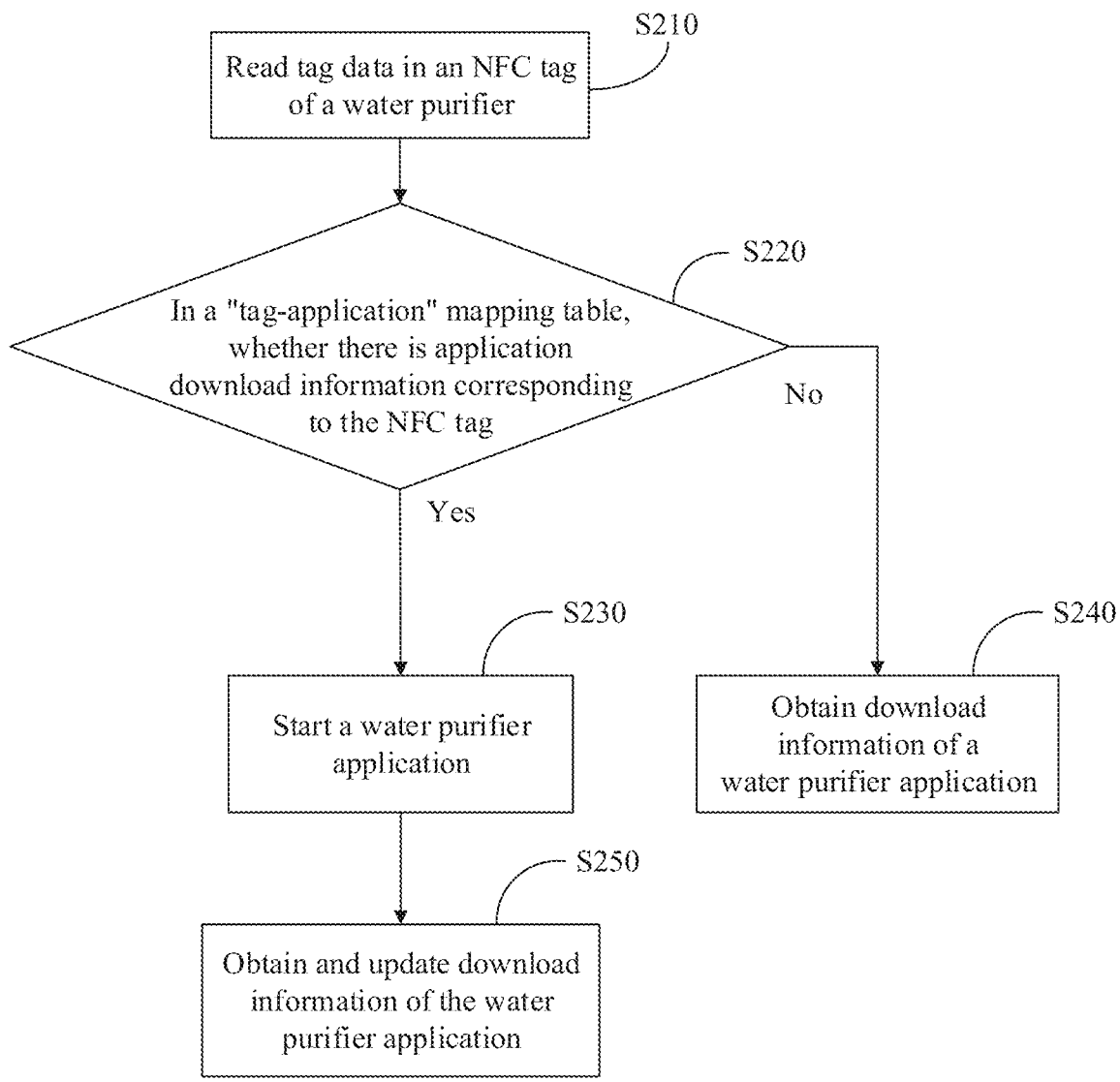
FIG. 9 is a schematic flowchart 2 of a method for obtaining download information of a device management application according to an embodiment of this application.

Specifically, refer to FIG. 9. The method provided in this embodiment includes the following steps.

S210: The mobile phone 100 reads the tag data in the NFC tag 201 of the water purifier. Specifically, the mobile phone 100 reads the tag data in the NFC tag 201 of the water purifier by using the NFC tag reading application. A process of step S210 is substantially the same as that of step S110 in Embodiment 1. Therefore, for other details of step S210 that are not described, refer to the descriptions in Embodiment 1. Details are not described again.

S220: The mobile phone 100 queries, in the "tag-application" mapping table, whether there is the application download information corresponding to the NFC tag data.

In this embodiment of this application, after obtaining the download information of the water purifier application from the IoT device vendor server, the mobile phone 100 may store a mapping relationship between the NFC tag data of the water purifier 200 and the download information of the water purifier application in the local "tag-application" mapping table of the mobile phone 100. "Tag" in "tag-application" represents the tag data in the NFC tag, and "application" represents the download information of the "water purifier" application.

In this way, when reading the NFC tag next time, the mobile phone 100 may start the water purifier application based on the download information of the water purifier application stored in the "tag-application" mapping table, to improve the application startup speed of the mobile phone 100, thereby improving user experience.

Specifically, the mobile phone 100 queries, in the "tag-application" mapping table by using the NFC tag reading application, whether there is the application download information corresponding to the NFC tag data. If there is the application download information corresponding to the NFC tag data, step S230 is performed to start the water purifier application. If there is no application download information corresponding to the NFC tag data, step S240 is performed to obtain the download information of the water purifier application from the IoT device vendor server.

In some embodiments, when determining that the mobile phone 100 reads the NFC tag of the water purifier 200 for the first time, the mobile phone 100 may not perform this step, but directly perform step S240.

S230: The mobile phone 100 starts the water purifier application based on the download information in the "tag-application" mapping table.

When the "tag-application" mapping table stores the download information corresponding to the NFC tag data, the mobile phone 100 starts the water purifier application by using the download information. A process in which the mobile phone 100 starts the water purifier application is substantially the same as the process of step S160 in Embodiment 1. Therefore, for implementation details of step S230, refer to the descriptions in Embodiment 1. Details are not described again.

S240: The mobile phone 100 obtains the download information of the water purifier application from the IoT device vendor server.

When the download information corresponding to the NFC tag data is not stored in the "tag-application" mapping table, the mobile phone 100 sends the NFC tag data and the application supporting capability information of the mobile phone 100 to the IoT device vendor server, to obtain the download information of the water purifier application from the IoT device vendor server. For implementation details of step S240, refer to the descriptions of step S120 to step S152 in Embodiment 1. Details are not described again.

After obtaining the download information of the water purifier application, the mobile phone 100 stores the mapping relationship between the NFC tag data and the download information in the local "tag-application" mapping table of the mobile phone 100.

S250: The mobile phone 100 obtains download information of a new water purifier application from the IoT device vendor server, and updates the download information in the local "tag-application" mapping table.

In this embodiment, when the mobile phone 100 reads the NFC tag 201 of the water purifier, even if the mobile phone 100 stores the application download information corresponding to the NFC tag data, the mobile phone 100 still obtains latest download information of the water purifier application from the IoT device vendor server (for a step of obtaining the download information, refer to the descriptions of step S120 to step S152 in Embodiment 1, and details are not described again), to update the "tag-application" mapping table.

Specifically, after obtaining the download information of the water purifier application from IoT tag management service, the mobile phone 100 compares the download information with the download information stored in the "tag-application" mapping table, and if the download information is inconsistent with the stored download information, replaces the download information in the "tag-application" mapping table with the download information obtained in this step. Therefore, according to the technical solution in this embodiment, when reading the NFC tag 201 of the water purifier 200 next time, the mobile phone 100 may start the water purifier application of a latest version based on the download information in the "tag-application" mapping table, and the user may not need to care about an application upgrade problem, improving user experience.

In some variants of this embodiment, step S250 may not need to be performed each time the NFC tag 201 of the water purifier is read, but may be performed according to a set condition. For example, when time since the NFC tag 201 of the water purifier is read last time exceeds a set duration (for example, three days), step S250 is performed.

It is to be noted that the serial numbers of the steps in the embodiments of this application are not used to limit an execution sequence of the steps. On the premise that the objective of the present disclosure is met, a person skilled in the art may adjust the execution sequence of the steps. For example, a sequence of steps S230 and S250 is swapped, or step S230 and step S250 are concurrently performed.

Embodiment 3

This embodiment is based on Embodiment 1. Based on Embodiment 1, the following variation is made in this embodiment: After reading the NFC tag of the water purifier 200, the mobile phone 100 does not directly send the water purifier application download information obtaining request to the IoT device vendor server, but sends the NFC tag data of the water purifier 200 to a mobile phone vendor server (used as a first server), and the mobile phone vendor server parses the NFC tag data to obtain the identification information of the water purifier 200, and sends, to the IoT device vendor server, the water purifier application download information obtaining request that carries the identification information of the water purifier 200. Therefore, in this embodiment, the mobile phone 100 does not need to parse the NFC tag data or directly communicate with each IoT device vendor server, but only needs to communicate with the mobile phone vendor server. In this way, the NFC tag reading application of the mobile phone 100 does not need to integrate a tag parsing SDK of each IoT device vendor server. Therefore, not only the NFC tag reading application can be lightweight, but also local storage space of the mobile phone 100 can be saved.

Figure 10A:
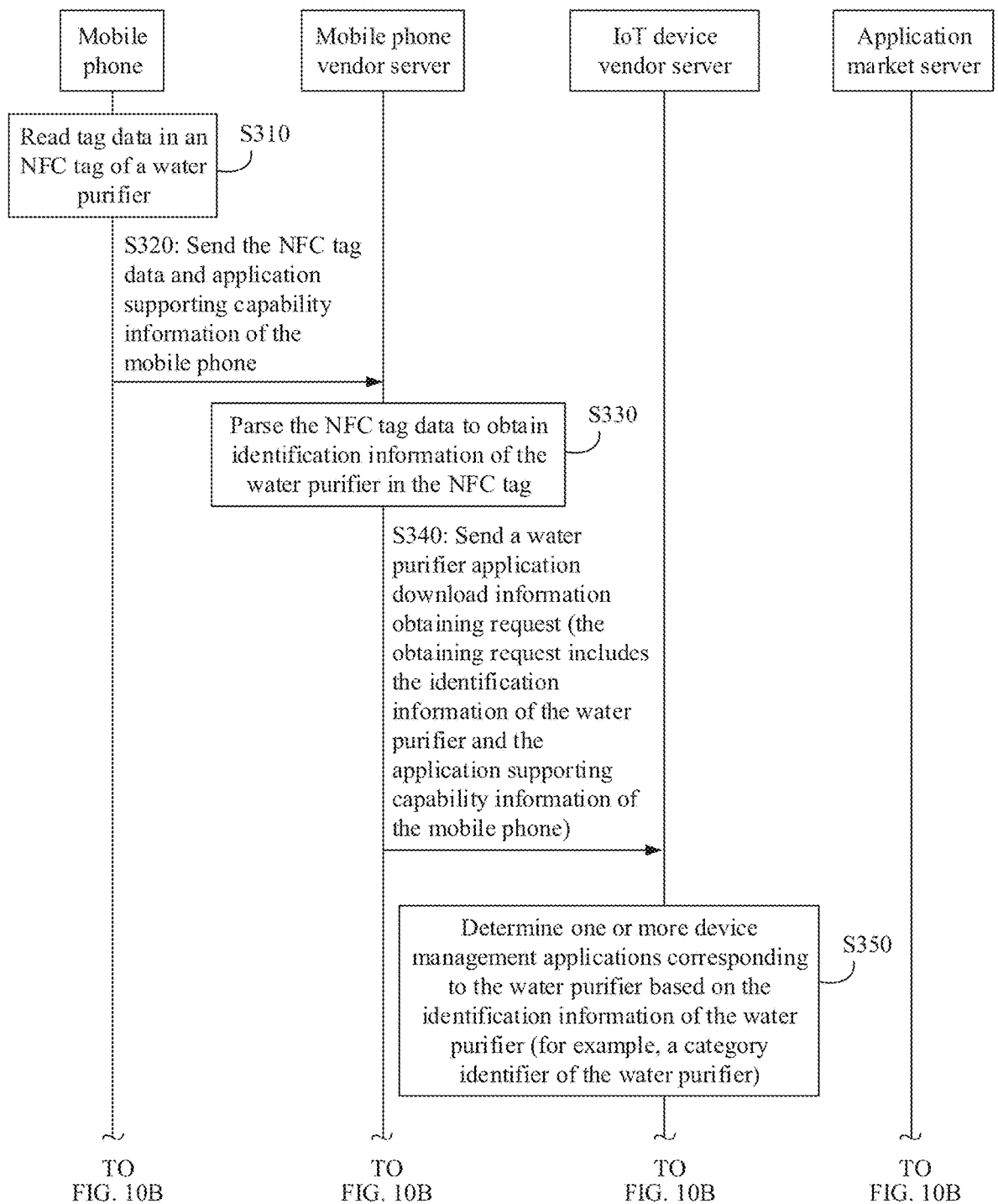

Refer to FIG. 10A and FIG. 10B. This embodiment includes the following steps.

S310: The mobile phone 100 reads the tag data in the NFC tag 201 of the water purifier.

The mobile phone 100 reads the tag data in the NFC tag 201 by using the NFC tag reading application installed in the mobile phone 100. When the NFC switch of the mobile phone 100 is turned on (the user may turn on the NFC switch in the manner shown in FIG. 6, or turn on the NFC switch in the system application menu "Settings"), the mobile phone 100 is placed close to the NFC tag 201 of the water purifier 200 or lightly touches the NFC tag 201 of the water purifier 200 (as shown in FIG. 1). The NFC tag reading application in the mobile phone 100 may read the tag data (that is, data in the "field value" column in Table 1) in the NFC tag 201.

S320: The mobile phone 100 sends the tag data of the NFC tag 201 and the application supporting capability information of the mobile phone 100 (used as a second request) to a mobile phone vendor server.

Specifically, the mobile phone 100 sends the NFC tag data of the water purifier 200 and the application supporting capability information of the mobile phone 100 to the mobile phone vendor server by using the NFC tag reading application. For a process in which the NFC tag reading application obtains the application supporting capability information of the mobile phone 100, refer to the description in step S120 in Embodiment 1.

S330: The mobile phone vendor server parses the NFC tag data of the water purifier to obtain the identification information of the water purifier 200 in the NFC tag.

After receiving the NFC tag data sent by the mobile phone 100, the mobile phone vendor server parses the NFC tag data to obtain the identification information of the water purifier 200 in the NFC tag. In this embodiment, the identification information of the water purifier 200 includes the vendor identifier and the category model identifier (that is, the data in the "vendor and device information" field in Table 1) of the water purifier 200, and the virtual serial number of the water purifier 200. This application is not limited thereto. In another embodiment, the identification information of the water purifier 200 includes one or more of the following: the category identifier of the water purifier 200, the model identifier of the water purifier 200, and the virtual serial number of the water purifier 200.

S340: The mobile phone vendor server sends the water purifier application download information obtaining request (used as the first request) to the IoT device vendor server, where the obtaining request includes the identification information of the water purifier 200 in the NFC tag data of the water purifier and the application supporting capability information of the mobile phone 100. By parsing the NFC tag data in step S330, the mobile phone vendor server may obtain the vendor identifier "4D44 (corresponding to the "MD" of the ASCII code)" of the water purifier 200 from the "vendor and device information" field of the NFC tag data, so as to determine that the vendor of the water purifier 200 is vendor A. Therefore, the mobile phone vendor server sends the identification information of the water purifier 200 and the application supporting capability information of the mobile phone 100 to the IoT device vendor server of vendor A.

S350: The IoT device vendor server determines the device management application corresponding to the water purifier 200 based on the identification information of the water purifier 200.

A process of step S350 is substantially the same as that of step S130 in Embodiment 1. Therefore, for implementation details of step S350, refer to the description in Embodiment 1. Details are not described again.

S360: The IoT device vendor server determines, based on the application supporting capability information of the mobile phone 100, the water purifier application suitable for the mobile phone 100.

A process of step S360 is substantially the same as that of step S140 in Embodiment 1. Therefore, for implementation details of step S360, refer to the description in Embodiment 1. Details are not described again.

S370: The IoT device vendor server sends the download information (used as the first request response) of the water purifier application (the "water purifier") to the mobile phone vendor server.

The specific form of the download information is not limited in this embodiment. The following provides several specific examples.

Example 1: The download information sent by the IoT device vendor server to the mobile phone vendor server is the installation package name (com.companyname.purifier01.apk) of the "water purifier".

Example 2: The download information sent by the IoT device vendor server to the mobile phone vendor server is the installation package name of the "water purifier" and the URL download address of the "water purifier" (for example, the URL download address of the water purifier is a download address of the "water purifier" application on the official website of the water purifier vendor).

For Example 1 and Example 2, after receiving the download information of the "water purifier" from the IoT device vendor server, the mobile phone vendor server may further request, from the application market server (for example, the Huawei AppGallery server) based on the installation package name of the "water purifier", the unique identifier of the "water purifier" in the application market, that is, the app ID. Specifically, after receiving the installation package name of the "water purifier" from the IoT device vendor server, the mobile phone vendor server sends, to the application market server, the app ID obtaining request carrying the installation package name of the "water purifier" (step S371 in FIG. 10A and FIG. 10B, used as a fourth request). After receiving the app ID obtaining request, the application market server queries the app ID of the "water purifier" in the application market based on the installation package name of the "water purifier", and returns the app ID of the "water purifier" to the mobile phone vendor server (step S372 in FIG. 10A and FIG. 10B, used as a fourth request response).

In some other embodiments, when returning the app ID of the "water purifier" to the mobile phone vendor server, the application market server further sends the installation package of the "water purifier" to the mobile phone vendor server together. The mobile phone vendor server may send the installation package of the "water purifier" to the mobile phone 100. In this way, when the mobile phone 100 starts the "water purifier" application, a step of downloading the installation package of the "water purifier" from the application market server may be omitted.

Example 3: The download information sent by the IoT device vendor server to the mobile phone vendor server is the installation package name of the "water purifier" and the app ID of the "water purifier".

Example 4: The download information sent by the IoT device vendor server to the mobile phone vendor server is the installation package name of the "water purifier", the app ID of the "water purifier", and the URL download address of the "water purifier".

For Example 3 and Example 4, the app ID sent by the IoT device vendor server to the mobile phone vendor server may be the app ID locally stored in the IoT device vendor server, or may be the app ID requested by the IoT device vendor server from the application market server based on the installation package name of the "water purifier" before sending the download information of the "water purifier" to the mobile phone 100.

In addition, for the foregoing Example 1 to Example 4, the download information sent by the IoT device vendor server to the mobile phone vendor server may further include the version information of the "water purifier", so that the mobile phone 100 updates the version of the "water purifier".

S380: The mobile phone vendor server locally stores the download information of the "water purifier".

After receiving the download information of the "water purifier", the mobile phone vendor server stores the information locally. Specifically, the IoT device vendor server locally stores, in association, the NFC tag data of the water purifier 200, the application supporting capability information of the mobile phone 100, and the download information of the "water purifier". In this way, when the mobile phone vendor server receives the application download information obtaining request of the mobile phone 100, but the mobile phone vendor server fails to obtain the application download information from the IoT device vendor server (for example, when a communication fault occurs), the mobile phone vendor server may send the locally stored download information of the "water purifier" to the mobile phone 100.

S390: The mobile phone vendor server sends the download information (as a second request response) of the water purifier application (the "water purifier") to the mobile phone 100.

In this step, the mobile phone vendor server sends, to the mobile phone 100, the download information of the "water purifier" received from the IoT device vendor server and the app ID of the "water purifier" requested from the application market server, so as to send the download information of the water purifier application (the "water purifier") to the mobile phone 100.

S395: The mobile phone 100 starts the "water purifier" based on the download information of the "water purifier".

A process of step S395 is substantially the same as that of step S160 in Embodiment 1. Therefore, for implementation details of step S395, refer to the description in Embodiment 1. Details are not described again.

In this embodiment, the mobile phone 100 does not directly send the water purifier application download information obtaining request to the IoT device vendor server, but forwards the request by using the mobile phone vendor server. Therefore, in this embodiment, there is no need to directly communicate with each IoT device vendor server. In this way, the NFC tag reading application of the mobile phone 100 does not need to integrate a tag parsing SDK of each IoT device vendor server. Therefore, not only the NFC tag reading application can be lightweight, but also local storage space of the mobile phone 100 can be saved.

In some variants of this embodiment, when receiving the water purifier application download information obtaining request from the mobile phone 100, the mobile phone vendor server first queries whether download information (that is, download information corresponding to the NFC tag data of the water purifier and the application supporting capability information of the mobile phone 100) corresponding to the obtaining request is stored locally. If yes, the mobile phone vendor server first returns the download information to the mobile phone 100, so that the mobile phone 100 starts the water purifier application based on the download information, which increases the application startup speed of the mobile phone 100 and improves user experience.

Figure 11:
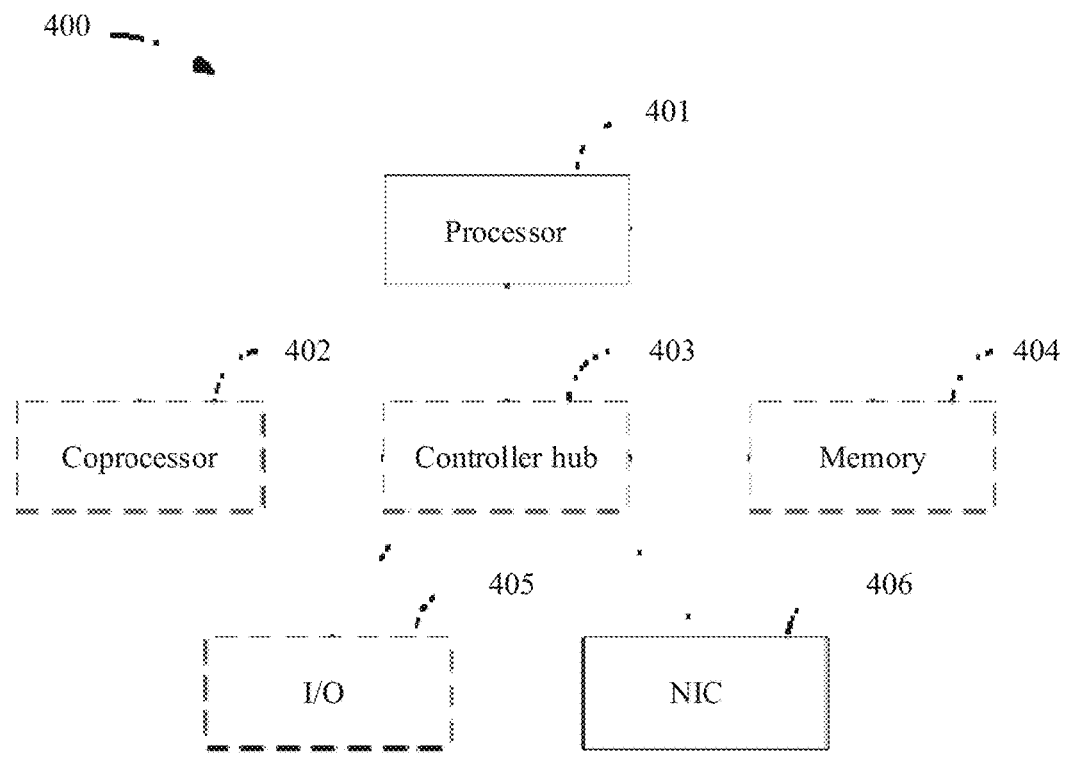
FIG. 11 is a block diagram of an electronic device according to an implementation of this application.

It is to be noted that the serial numbers of the steps in the embodiments of this application are not used to limit an execution sequence of the steps. A person skilled in the art may adjust the execution sequence of the steps, for example, swap a sequence of step S350 and step S360. FIG. 11 shows a block diagram of an electronic device 400 according to an embodiment of this application. The electronic device 400 may include one or more processors 401 coupled to a controller hub 403. For at least one embodiment, the controller hub 403 communicates with the processor 401 by using a multi-branch bus such as a front side bus (FSB), a point-to-point interface such as a quick path interconnect (QPI) interface, or a similar connection. The processor 401 executes instructions for controlling a general type of data processing operation. In an embodiment, the controller hub 403 includes, but is not limited to, a graphics memory controller hub (GMCH) (not shown) and an input/output hub (IOH,) (which may be on a separate chip) (not shown). The GMCH includes a memory and a graphics controller, and is coupled to the IOH.

The electronic device 400 may further include a coprocessor 402 and a memory 404 that are coupled to the controller hub 403. Alternatively, one or both of the memory and the GMCH may be integrated into the processor (as described in this application). The memory 404 and the coprocessor 402 are directly coupled to the processor 401 and the controller hub 403. The controller hub 403 and the IOH are located in a single chip.

The memory 404 may be, for example, a dynamic random access memory (DRAM,), a phase change memory (PCM), or a combination of both. The memory 404 may include one or more tangible and non-transitory computer-readable media configured to store data and/or instructions. The computer-readable storage medium stores instructions, and specifically, stores temporary and permanent copies of the instructions. The instruction may include an instruction that is executed by at least one of the processors and that enables the electronic device 400 to implement the steps performed by the mobile phone in the methods shown in FIG. 5, FIG. 9, and FIG. 10A and FIG. 10B. When the instruction runs on a computer, the computer is enabled to perform the methods disclosed in Embodiment 1, Embodiment 2, and/or Embodiment 3.

In an embodiment, the coprocessor 402 is a dedicated processor, for example, a high-throughput many integrated core (MIC) processor, a network or communication processor, a compression engine, a graphics processor, a general-purpose computing on a graphics processing unit (GPGPU), or an embedded processor. The optional properties of the coprocessor 402 are represented by dashed lines in FIG. 11.

In an embodiment, the electronic device 400 may further include a network interface (e.g., a network interface controller (NIC)) 406. The network interface 406 may include a transceiver, configured to provide a radio interface for the electronic device 400, to communicate with any another suitable device (such as a front-end module or an antenna). In various embodiments, the network interface 406 may be integrated with another component of the electronic device 400. The network interface 406 may implement a function of the communications unit in the foregoing embodiment.

The electronic device 400 may further include an input/output (I/O) device 405. The I/O 405 may include: a user interface, where this design enables a user to interact with the electronic device 400; a peripheral component interface, where this design enables the peripheral component to interact with the electronic device 400; and/or a sensor, where this sensor is configured to determine an environmental condition and/or location information related to the electronic device 400.

It is to be noted that FIG. 11 is merely an example. To be specific, although FIG. 11 shows that the electronic device 400 includes a plurality of components such as the processor 401, the controller hub 403, and the memory 404, in actual application, a device using the methods in this application may include only some of the components of the electronic device 400, for example, may only include the processor 401 and the network interface 406. In FIG. 11, properties of the optional components are shown by using dashed lines.

Figure 12:
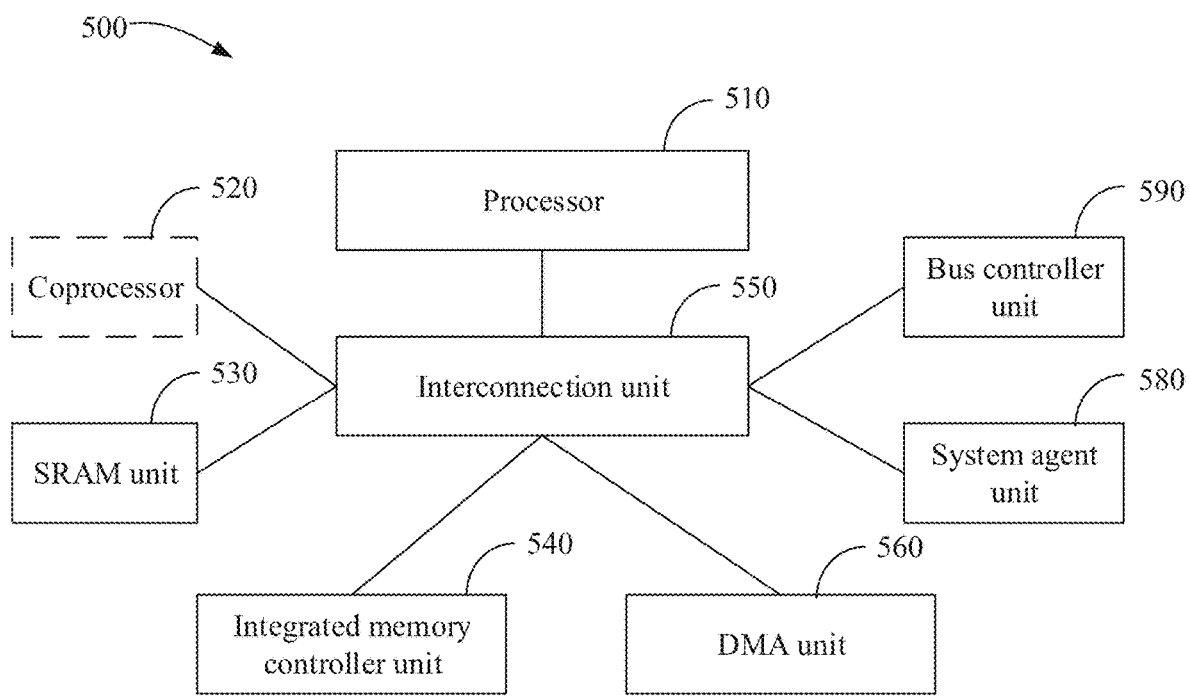
FIG. 12 is a schematic diagram depicting a structure of a system on chip (SoC) according to an implementation of this application.

FIG. 12 shows a block diagram of a SoC (System on Chip, system on chip) 500 according to an embodiment of this application. In FIG. 12, similar components have a same reference numeral. In addition, a dashed-line box is an optional feature of a more advanced SoC. In FIG. 12, the SoC 500 includes: an interconnection unit 550 coupled to a processor 510; a system agent unit 580; a bus controller unit 590; an integrated memory controller unit 540; one group of or one or more coprocessors 520 that may include integrated graphics logic, an image processor, an audio processor, and a video processor; a static random access memory (SRAM) unit 530; and a direct memory access (DMA) unit 560. In an embodiment, the coprocessor 520 includes a dedicated processor, for example, a network or communication processor, a compression engine, a GPGPU, a high-throughput MIC processor, or an embedded processor.

The SRAM unit 530 may include one or more tangible and non-transitory computer-readable media configured to store data and/or instructions. The computer-readable storage medium stores instructions, and specifically, stores temporary and permanent copies of the instructions. The instruction may include an instruction that is executed by at least one of the processors and that enables the SoC to implement the steps performed by the mobile phone in the methods shown in FIG. 5, FIG. 9, and FIG. 10A and FIG. 10B. When the instruction runs on a computer, the computer is enabled to perform the methods disclosed in Embodiment 1, Embodiment 2, and/or Embodiment 3.

The term "and/or" in this specification describes only an association relationship for describing associated objects and represents that three relationships may exist. For example, A and/or B may represent the following three cases: Only A exists, both A and B exist, and only B exists.

All method implementations of this application may be implemented by software, a magnetic component, firmware, or the like.

Program code may be used to input instructions, to perform functions described in this specification and generate output information. The output information may be applied to one or more output devices in a known manner. For a purpose of this application, a processing system includes any system having a processor such as a digital signal processor (DSP), a microcontroller, an application-specific integrated circuit (ASIC), or a microprocessor.

The program code may be implemented in a high-level procedural language or an object-oriented programming language, to communicate with the processing system. The program code may alternatively be implemented by using an assembly language or a machine language when needed. Actually, the mechanism described in this specification is not limited to a scope of any particular programming language. In any case, the language may be a compiled language or an interpretive language.

One or more aspects of at least one embodiment may be implemented by using representative instructions stored on a computer-readable storage medium. The instructions represent various logic in a processor, and when the instructions are read by a machine, the machine acts on the logic for performing the technologies described in this specification. These representations referred to as "intellectual property (IP) cores" may be stored in a tangible computer-readable storage medium and provided to a plurality of customers or production facilities for loading into a manufacturing machine that actually manufactures the logic or the processor.

In some cases, an instruction converter may be configured to convert instructions from a source instruction set to a target instruction set. For example, the instruction converter may convert, in a transform (for example, a static binary transform, or a dynamic binary transform including dynamic compilation), morphing, emulation, or another manner, the instructions into one or more other instructions processed by a core. The instruction converter may be implemented by software, hardware, firmware, or a combination thereof. The instruction converter may be located on the processor, outside the processor, or partially on the processor and partially outside the processor.

The invention claimed is:

1. A method comprising:

reading, by a first device of the system, tag data of a second device of the system;

receiving, by a second server of the system, a first request that carries first identification information of the second device and application supporting capability information of the first device, wherein the first identification information is associated with the tag data, wherein the first request asks for download information of a device management application from the second server, wherein the device management application is for managing the second device, and wherein the download information comprises an installation package name and an application identifier (ID) of the device management application;

determining, by the second server in response to the first request, the device management application based on the first identification information and the application supporting capability information of the first device;

sending, by the second server, a first response that carries the download information of the device management application;

receiving, by the first device and from the second server, the first response;

obtaining, by the first device, the download information of the device management application from the first response;

sending, by the first device and to a third server of the system, a third request that carries the installation package name and that is for obtaining the application ID;

determining, by the third server in response to the third request, the application ID based on the installation package name;

sending, by the third server and to the first device, a third response that carries the application ID; and receiving, by the first device, the application ID from the third server.

2. The method of claim 1, wherein the application supporting capability information comprises one or more of first information for identifying a product model of the first device or second information about an operating system of the first device, wherein the first information comprises at least one of a product brand of the first device, the product model of the first device, a product category of the first device, or a product serial number of the first device, and wherein the second information comprises at least one of a name of the operating system or a version number of the operating system.

3. The method of claim 1, wherein the first device comprises a first software development kit (SDK), and wherein before receiving the first request, the method further comprises:

parsing, by the first device, the tag data using the first SDK to obtain second identification information comprised in the tag data, wherein the second identification information comprises one or more of a category identifier of the second device, a model identifier of the second device, or a first serial number of the second device; and sending, by the first device, the first request to the second server.

4. The method of claim 3, wherein the download information further comprises a uniform resource locator (URL) download address of the device management application.

5. The method of claim 4, wherein sending the first response comprises sending the first request response to the first device, and wherein obtaining the download information of the device management application comprises receiving the download information of the device management application from the second server.

6. The method of claim 1, wherein before receiving the first request, the method further comprises:
sending, by the first device and to a first server of the system, a second request that carries the tag data and the application supporting capability information;
parsing, by the first server, the tag data to obtain second identification information comprised in the tag data, wherein the second identification information comprises one or more of a category identifier of the second device, a model identifier of the second device, or a first serial number of the second device; and
sending, by the first server and to the second server, the first request.

7. The method of claim 6, wherein the download information further comprises a uniform resource locator (URL) download address of the device management application.

8. The method of claim 7, wherein before obtaining the download information of the device management application, the method further comprises:
receiving, by the first server and from the second device, the download information of the device management application; and
sending, by the first server and to the first device, a second response that comprises the download information of the device management application, and
wherein obtaining the download information of the device management application comprises obtaining, by the first device, from the second server, and in response to the first device receiving the second response, the download information of the device management application.

9. The method of claim 8, wherein the download information comprises the installation package name, and wherein before sending the second response to the first device, the method further comprises:
sending, by the first server and to a third server of the system, a fourth request that carries the installation package name and that is for obtaining the application ID;
determining, by the third server in response to the fourth request, the application ID based on the installation package name;
sending, by the third server and to the first server, a fourth response that carries the application ID; and
receiving, by the first server and from the third server, the application ID,
wherein sending the second response comprises sending, by the first server and to the first device, the second response, and wherein the second response comprises the application ID of the device management application and the download information of the device management application, and wherein obtaining the download information of the device management application comprises obtaining, by the first device in response to receiving the second response, the application ID and the download information of the device management application.

10. A method comprising:
receiving a first request that carries identification information of a second device associated with the second server and application supporting capability information of a first device, wherein the identification information is associated with tag data of the second device, wherein the identification information comprises one or more of a category identifier of the second device, a model identifier of the second device, or a first serial number of the second device, wherein the first request asks for download information of a device management application from the second server, and wherein the device management application is for managing the second device;
determining, in response to the first request, the device management application based on the identification information and the application supporting capability information of the first device, wherein the identification information further comprises the first serial number, wherein the first serial number is different from a product serial number of the second device and is associated with the product serial number, and wherein determining the device management application comprises:
determining, based on the first serial number, the product serial number;
determining, based on the product serial number, one or more applications for managing the second device; and
determining, from the one or more applications and based on the application supporting capability information, a first device management application capable of running on the first device as the device management application; and
sending a first response that carries the download information of the device management application.

11. The method of claim 10, wherein the identification information comprises a category identifier of the second device, and wherein determining the device management application based on the identification information and the application supporting capability information comprises:
determining, based on the category identifier, one or more applications for managing the second device; and
determining, from the one or more applications and based on the application supporting capability information, a first device management application capable of running on the first device as the device management application.

12. The method of claim 10, wherein the download information of the device management application comprises an application identifier (ID) of the device management application.

13. The method of claim 10, wherein the application supporting capability information comprises one or more of first information for identifying a product model of the first device or second information about an operating system of the first device, wherein the first information comprises at least one of a product brand of the first device, the product model of the first device, a product category of the first device, or a product serial number of the first device, and wherein the second information comprises at least one of a name of the operating system or a version number of the operating system.

14. The method of claim 10, wherein the download information of the device management application comprises an installation package name of the device management application.

15. The method of claim 10, wherein the download information of the device management application comprises a uniform resource locator (URL) download address of the device management application.

16. A method comprising:
   receiving, from a first device associated with the first server, a second request that carries tag data of a second device and application supporting capability information of the first device;
   obtaining identification information of the second device from the tag data through parsing, wherein the identification information comprises one or more of a category identifier of the second device, a model identifier of the second device, or a first serial number of the second device;
   sending, to a second server, a first request that carries the identification information and the application supporting capability information, and wherein the first request requests, from the second server, download information of a device management application for managing the second device;
   receiving, from the second sever, a first response that carries the download information of the device management application;
   sending, to the first device, a second response that carries the download information of the device management application; and
   storing an association relationship between the tag data, the application supporting capability information of the first device, and the download information of the device management application.

17. The method of claim 16, wherein the download information of the device management application comprises an application identifier (ID) of the device management application.

18. The method of claim 16, wherein the download information of the device management application comprises an installation package name of the device management application, and wherein before sending the second response, the method further comprises:
   sending, to a third server, a fourth request that carries the installation package name and that is for obtaining an application identifier (ID) of the device management application;
   receiving, from the third server, a fourth response that carries the application ID; and
   sending, to the first device, the second response, wherein the second response further comprises the application ID.

19. The method of claim 16, wherein the download information of the device management application comprises an installation package name of the device management application.

20. The method of claim 16, wherein the download information of the device management application comprises a uniform resource locator (URL) download address of the device management application.

* * * * *